US010766802B2

(12) United States Patent
Tsao

(10) Patent No.: US 10,766,802 B2
(45) Date of Patent: Sep. 8, 2020

(54) FLEXIBLE 3D FREEFORM TECHNIQUES

(71) Applicant: National Tsing Hua University, Hsinchu (TW)

(72) Inventor: Che-Chih Tsao, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 386 days.

(21) Appl. No.: 14/953,030

(22) Filed: Nov. 27, 2015

(65) Prior Publication Data

US 2016/0151833 A1      Jun. 2, 2016

Related U.S. Application Data

(60) Provisional application No. 62/085,509, filed on Nov. 29, 2014.

(51) Int. Cl.
*B29C 67/00* (2017.01)
*C03B 19/00* (2006.01)
*B23K 9/04* (2006.01)
*B33Y 30/00* (2015.01)
*C03B 19/02* (2006.01)
(Continued)

(52) U.S. Cl.
CPC ............... *C03B 19/00* (2013.01); *B23K 9/04* (2013.01); *B29C 64/106* (2017.08); *B29C 64/135* (2017.08); *B29C 64/165* (2017.08); *B29C 64/386* (2017.08); *B33Y 30/00* (2014.12); *C03B 19/025* (2013.01); *B33Y 10/00* (2014.12); *B33Y 50/02* (2014.12)

(58) Field of Classification Search
CPC ... B29C 64/106; B29C 64/209; B29C 64/118; B29C 64/10
See application file for complete search history.

(56) References Cited

U.S. PATENT DOCUMENTS 5,740,051 A * 4/1998 Sanders, Jr. .......... B29C 64/106
                                                    700/119
6,030,199 A * 2/2000 Tseng ..................... B29C 41/12
                                                    425/132
(Continued)

OTHER PUBLICATIONS

Laser Deposition Technology (LDT); http://www.rpm-innovations.com/laser_deposition_technology; 3 pages.
(Continued)

*Primary Examiner* — Jason L Lazorcik
(74) *Attorney, Agent, or Firm* — Wang Law Firm, Inc.

(57) ABSTRACT

This invention relates to processes and systems of rapid prototyping and production. Its features includes flexible material deposition along tangential directions of surfaces of a part to be made, thereby eliminating stair-shape surface due to uniform horizontal layer deposition, increasing width of material deposition to increase build up rate, applying the principles of traditional forming/joining processes, such as casting, fusion welding, plastic extrusion and injection molding in the fabrication process so that various industrial materials can be processed, applying comparatively low cost heating sources, such as induction heating and arc-heating. Additional features include varying width and size of material deposition in accordance with geometry to be formed and applying a differential molding means for improved shape formation and surface finishing.

14 Claims, 11 Drawing Sheets

(51) Int. Cl.
  *B29C 64/165* (2017.01)
  *B29C 64/106* (2017.01)
  *B29C 64/135* (2017.01)
  *B29C 64/386* (2017.01)
  *B33Y 10/00* (2015.01)
  *B33Y 50/02* (2015.01)

(56) References Cited

U.S. PATENT DOCUMENTS

| | | | | |
|---|---|---|---|---|
| 6,934,600 | B2* | 8/2005 | Jang | B82Y 30/00 |
| | | | | 264/109 |
| 9,126,365 | B1* | 9/2015 | Mark | B29C 70/20 |
| 9,796,140 | B2* | 10/2017 | Page | B29C 64/106 |
| 2004/0217095 | A1* | 11/2004 | Herzog | B22F 3/1055 |
| | | | | 219/121.85 |
| 2006/0158456 | A1* | 7/2006 | Zinniel | B33Y 30/00 |
| | | | | 345/589 |
| 2014/0284832 | A1* | 9/2014 | Novikov | B29C 67/0088 |
| | | | | 264/40.1 |
| 2015/0266244 | A1* | 9/2015 | Page | B22F 3/1055 |
| | | | | 425/78 |
| 2015/0290875 | A1* | 10/2015 | Mark | B29C 70/20 |
| | | | | 264/138 |
| 2015/0343705 | A1* | 12/2015 | Chen | B33Y 10/00 |
| | | | | 428/34.1 |
| 2015/0367375 | A1* | 12/2015 | Page | B29C 67/0055 |
| | | | | 118/697 |
| 2016/0001461 | A1* | 1/2016 | Gardiner | B25J 11/00 |
| | | | | 264/219 |
| 2016/0136897 | A1* | 5/2016 | Nielsen-Cole | B33Y 30/00 |
| | | | | 425/131.1 |
| 2017/0066186 | A1* | 3/2017 | Gardiner | B29C 67/0055 |
| 2017/0120519 | A1* | 5/2017 | Mark | B33Y 10/00 |

OTHER PUBLICATIONS

M. Orme and R.F. Smith, "Enhanced Aluminum Properties by Means of Precise Droplet Deposition", Journal of Manufacturing Science and Engineering, Aug. 2000, vol. 122, p. 484-493.

Tool Steel Filler Metal Characteristics—TIG Welding from http://www.stoodyind.com/Catalogs/FISC/05catpg394.pdf; 1 page.

Welding-Tool-Steel:Difficult but Rewarding Task. Solutions with Effective, Practical Advice from http://www.welding-advisers.com/Welding-Tool-Steel.html; 1 page.

* cited by examiner (a) Prior art    (b) Prior Art (a)    (b)

(a)    (b)

(a)

(b)

FLEXIBLE 3D FREEFORM TECHNIQUES

CROSS-REFERENCE TO RELATED APPLICATIONS AND OTHER DOCUMENTS

This application claims the benefit of prior U.S. provisional application No. 62/085,509, filed 29 Nov. 2014, the contents of which are incorporated herein by reference.

BACKGROUND OF THE INVENTION

This invention relates to systems and methods of rapid prototyping and production (or called additive manufacturing or 3D printing). Especially, this invention relates to fabricating 3D prototypes, articles, components and molds at improved surface finish and increased speed.

Existing major rapid prototyping (also known as additive manufacturing or 3D printing) techniques include methods such as SLM (Selective Laser Melting) for making metal parts (for examples, EOS M400, referring to http://www.eos.info/systems_solutions/metal/systems_equipment/eos_m_400, 3D Systems SPro 250, see http://production3dprinters.com/sites/production3dprinters.com/files/downloads/sPro-125-250-SLM-Direct-Metal.pdf, or Renishaw AM250, referring to http://www.renishaw.com/en/am250-laser-melting-machine--15253)), and SLA ((Stereolithography) (for example, 3D Systems ProJet HD 7000, referring to http://printin3d.com/sites/printin3d.com/files/downloads/ProJet-6000-7000-USEN.pdf), FDM (Fused Deposition Modeling) (e.g. Stratasys FDM 900m, referring to http://www.fortus.com/Products/Fortus-900mc.aspx) and 3DP (3D Printing) (jetting binders to powder bed layer-by-layer) for making plastic parts.

In general, these existing rapid prototyping methods apply a layer-by-layer construction methodology. Materials are dispensed in horizontal layers and within each layer joined by point scanning. Material build-up by horizontal layers, regardless of the 3D shape to be built, creates inevitable layered (stairs-like) surface feature, resulting in poor surface finish. Material joining by point scanning is basically "scanning a 3D body by one tiny point", resulting in slow build-up rate. Combined operation of layer dispensing and point-scanning joining slows down the process further. FIG. 1 illustrates an example 3D part. FIG. 2 illustrates the fabrication of this example 3D part by the existing methodology. FIG. 2(a) shows the blade portion and FIG. 2(b) shows the cross-sectional view. Dotted lines 201 indicate the grid structure of horizontal layers and solid curves 203 indicate trajectories of point scanning. Stairs-like surface features at 214 and 212 are inevitable.

When using the SLM technique to make a mold for plastic injection molding, the surface finish can be about 40 um Ra and a machining tolerance of 200~500 um is generally required, which makes post machining cost significant. There are studies on post polishing using laser beams. (Referring to Lamikiz et al., "Laser polishing of parts built up by selective laser sintering"; International Journal of Machine Tools & Manufacture 47 (2007) 2040-2050). In order to improve forming speed, a so called "skin-core strategy" was developed, which uses a laser of small focal spot to scan edges of patterns in each layer and a larger focal spot to scan the interior. (Referring to (1) K. Wissenbach, "Fantasia Project Shows Selective Laser Melting Can Produce Complex Components Quickly and Cost Effectively", http://www.ineffableisland.com/2010/05/fantasia-project-shows-selective-laser.html?showComment=1318241730096; (2) C. Hinke, "Direct, Mould-less Production Systems", http://www.production-research.de/_C12577F20052BDC7.nsf/html/de_040d66b2c812b739c1257829005207de.html). But these methods also increase equipment costs.

In the FDM technique, U.S. Pat. No. 5,121,329, which is incorporated herein for this current application by reference, describes methods of moving a material dispensing head along curved trajectories to produce curved surfaces or frames and of dispensing materials of variable thickness by changing material feed rate (referring to FIG. 10 and FIG. 12 of that patent). However, because the FDM method uses a fixed orifice size to dispense material, the effect of speed Increasing is likely to be limited. In another FDM related technique, U.S. Pat. No. 8,221,669, which is incorporated herein for this current application by reference, describes the use of ribbon (non-cylindrical) filament as material, in contrast to the cylindrical filament used in most current commercial systems, in order to reduce the so called "response time", that is, the delay time from the start or stop of the feeding mechanism to the actual flow rate change at the tip of the extrusion tip of the liquefier. But it should be noted that faster material deposition is not the purpose nor mentioned in this patent.

There are other methods developed or under development for making metal objects.

For example, applying the FDM technique to make metal parts has been attempted. U.S. Pat. No. 7,942,987, which is incorporated herein for this current application by reference, describes a method of heating a metal alloy to a temperature between a solidus temperature and a liquidus temperature to obtain a semi-solid metal alloy with enough viscosity so that it can be extruded. However, the "point scanning" and "layer by layer" issues are not addressed in this approach.

Another approach is called Laser Deposition Technology (LDT) or Laser Engineered Net Shape (LENS). Metal powder is injected into a focused beam of a high-power laser under tightly controlled atmospheric conditions. The focused laser beam melts the surface of the target material and generates a small molten pool of base material. Powder delivered into this same spot is absorbed into the melt pool, thus generating a deposit. By moving the laser beam and the deposition relative to the target material, 3D shapes can be built up. A description of the process can be found from http://www.rpm-innovations.com/laser_deposition_technology and related technical details can be seen in U.S. Pat. Nos. 4,323,756 and 5,043,548, which are incorporated herein by reference. A very similar method, except using wire metal instead of powder, was described in U.S. Pat. No. 5,578,227, which is incorporated herein by reference. In general, these approaches are basically still a "point scanning" based approach. Further, surfaces of built-up parts are usually rough.

BRIEF SUMMARY OF THE INVENTION

The basic principle of the Flexible 3D Freeform technique is to dispense a solidifiable material in a fluid state from a dispensing head onto a base member to build up the material, which solidifies under preset ambient conditions, in a basically continuous fashion according to a predetermined relative movement sequence between the dispensing head and the base member. Based on this principle, this invention comprises a feature of dispensing the solidifiable material along the tangential directions of the surface of the 3D article to be fabricated so that the layered surface feature in existing rapid prototyping processes is eliminated and the surface finish is improved. This invention also comprises a feature of enlarged width of dispensed materials and a corresponding new 3D forming procedure so that fabrication speed can be increased significantly. For these purposes, this invention includes a motion mechanism of multiple degrees of freedom to provide the required relative movement sequence between the dispensing head and the base member. Further, this invention includes a feature of adjusting the width, thickness and flow speed of the dispensed material according to needs from local geometry of a 3D article during the dispensing process. The dispensing head dispenses material in a few basic shapes including ribbon (band), wire and dot. When the geometry of the 3D object to be fabricated allows, wide, ribbon-shaped material can be dispensed so that building speed can be increased. Dispensed materials of wire- and dot-shapes can be applied to build up fine and complex features. Still further, this invention includes a differential molding means, which applies a solid or fluid means in contact with selected positions on dispensed material while it is solidifying, to restrict the flow of and to shape the solidifying material. By this means, good surface finish can be obtained. Curvature in the direction along the width of a ribbon-shaped dispensed material can also be made by this means.

A variation of this invention is to dispense a joinable material in particulate form and simultaneously apply a joining means to the material dispensed at the target area such that the dispensed particulate material starts to join into an integral material.

DETAILED DESCRIPTION

Figure 1:
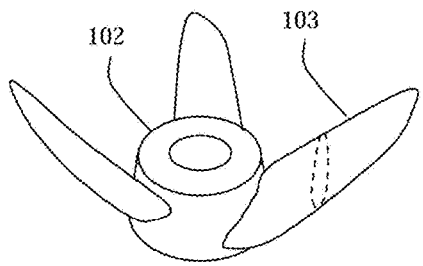
FIG. 1 depicts an example of 3D article.
Figure 2:
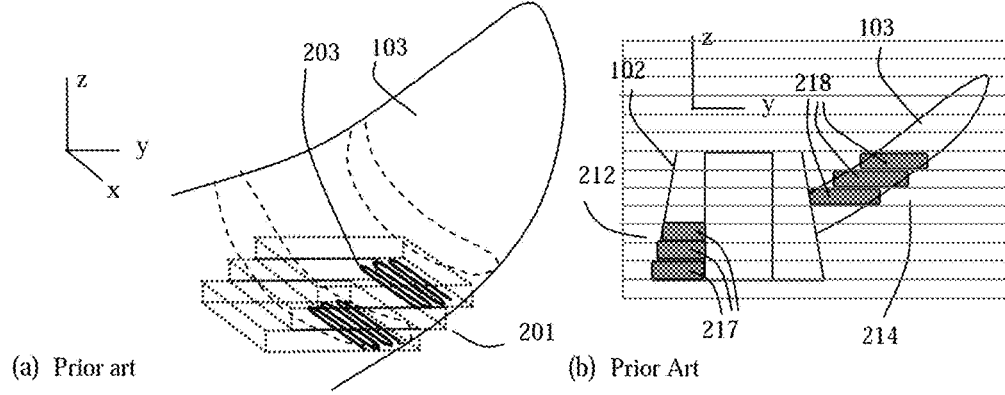
FIG. 2 illustrates the layer-by-layer construction methodology used in the prior arts.
Figure 3:
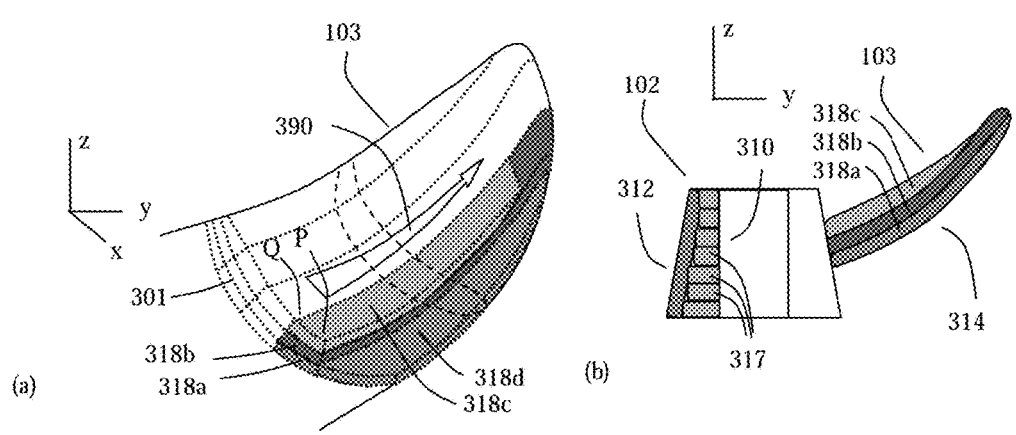
FIG. 3 explains the basic concept of this invention using the 3D object depicted in FIG. 1 as an example.

FIG. 3 explains the basic concept of the invention using the 3D object depicted in FIG. 1 as an example. When making the hub 102, materials can be dispensed in horizontal layers and built up vertically, as shown by 310 of FIG. 3(b), similar to 212 of FIG. 1(b), because the inner wall of the hub is vertical. However, when making the outer wall, the preferred material dispensing direction is along the tangential direction of the wall, so that stair-like features can be eliminated and good surface finish can be obtained (312). Especially, when making the blades 103, dispensing materials along the tangential direction of the curved blade geometry can improve surface finish very significantly (FIG. 3(b) 314). In FIG. 3 (a), dotted-lines 301 depict the grid structure using this Flexible 3D Freeform technique. The grid structure has 3 layers stacked together and each layer is distributed along the tangential direction of the curved blade geometry. Materials dispensed according to the grid structure are shown as 318a, 318b and 318c.

Figure 4:
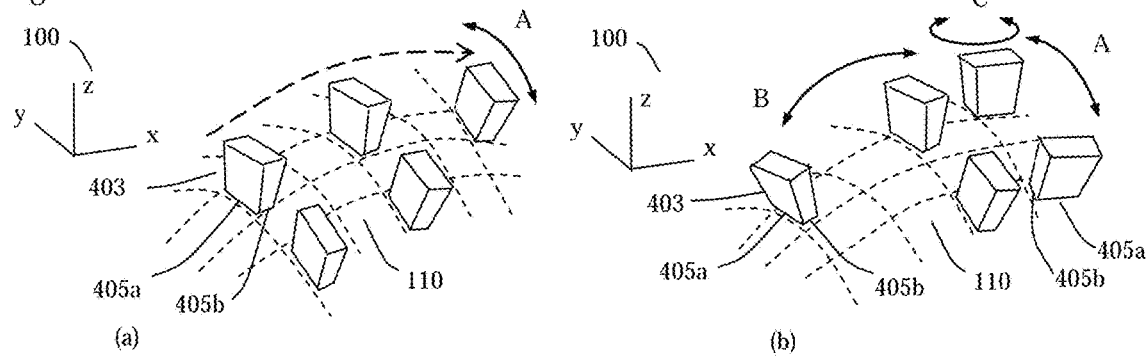
FIG. 4 illustrates the spatial relationship between a material dispensing head of this invention and an example 3D surface.

Moving the dispensing head to trace arbitrary 3D surfaces relative to the base member requires a mechanism of multiple degrees of freedoms. In general, if the exit of the material dispensing head is just a single orifice, close to a spot or a point in geometry, then a motion means of 3 degree-of-freedom (DOF) is enough to allow a section of an arbitrary 3D surface to be traced by a point spot. However, if dispensing of wide band-shaped material is preferred, then a motion means of at least 4 DOF is preferred. FIG. 4(a) illustrates the situation. The exit of the material dispensing head 403 has a long (width) edge 405a and a short edge 405b. In order to dispense material at maximal width, the dispensing head must move and trace the 3D surface 110 in a direction perpendicular to the edge 405a. In order to accommodate the change of surface curvature perpendicular to the motion direction (which is x-direction in FIG. 4), one rotational DOF (A-axis, which rotates about x-direction) is needed. That is, the system has 3 independent linear DOFs (x, y, z) and one rotary DOF (A). A more preferred arrangement applies 3 independent linear DOFs (x, y, z) and 2 rotary DOF (A and B, which rotates about y-direction). This is illustrated in FIG. 4(b). The addition of B DOF allows the dispensing head to always maintain a fixed angle with respect to the target area. A still more preferred arrangement is to add a third rotary DOF C, which rotates about z-direction. This allows the dispensing head to move in basically any direction with maximal dispensing width, or with any reduced dispensing width, which will be further described in later texts.

Figure 5:
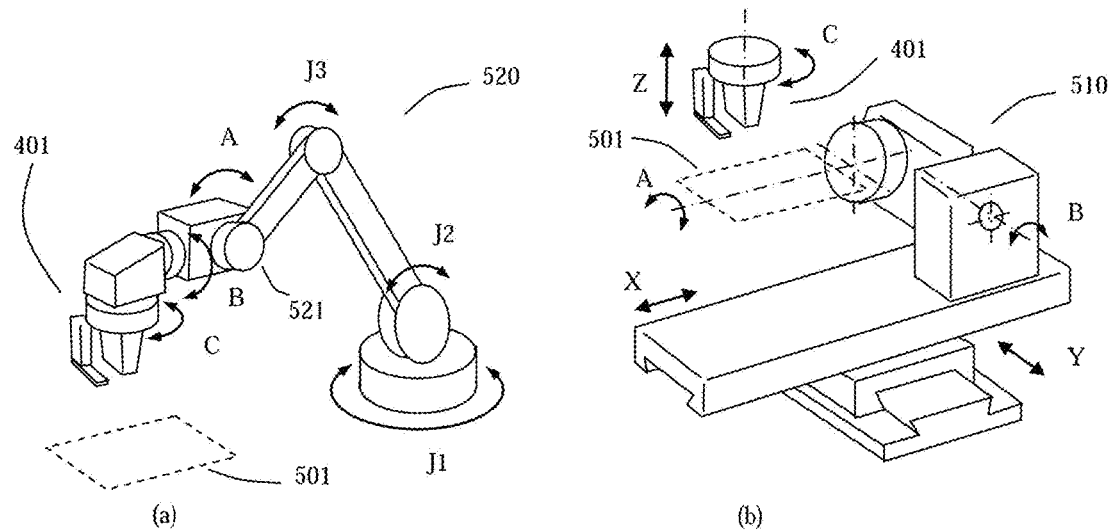
FIG. 5 illustrates two examples of mechanisms to provide the required relative movements between the material dispensing head and the base in this invention.

There are many options of mechanisms to provide the required relative movements between the material dispensing head and the base. FIG. 5(a) illustrates one example, which is basically in a robotic arm configuration 520. The rotations at 3 joints, J1, J2 and J3, can place the end 521 of the robotic arm to basically any position (x, y, z) relative the base area 501, whereas A. B and C 3 axes can rotate the material dispensing system 401 to any orientation. FIG. 5(b) illustrates another example, which is basically a 5-DOF (5-axis) mechanism comprising 3 linear DOFs (X, Y, Z) and 2 rotational DOFs (A about X-axis and B about Y-axis). The base area 501, carrying the base and the 3D article to be fabricated on the base, is attached to the A-axis rotary stage. The material dispensing system is attached to the Z-stage. The dispensing head can rotate about the Z-axis, forming the 6th DOF (C-axis). Other configurations and variations can be made by people skilled in the arts based on the teaching of this current document.

Further, this invention includes the feature of adjusting width and thickness of the dispensed material according to needs from local geometric characteristics of a 3D article during the dispensing process. The dispensing head dispenses material in a few basic shapes including ribbon (band), wire and dot. When the geometry of the 3D object to be fabricated allows, wide, ribbon-shaped material can be dispensed so that building speed can be increased. If geometric features to be built are small and fine, then the width and thickness of the dispensed material can be reduced to dispense wires and dots accommodate the situation.

Figure 6:
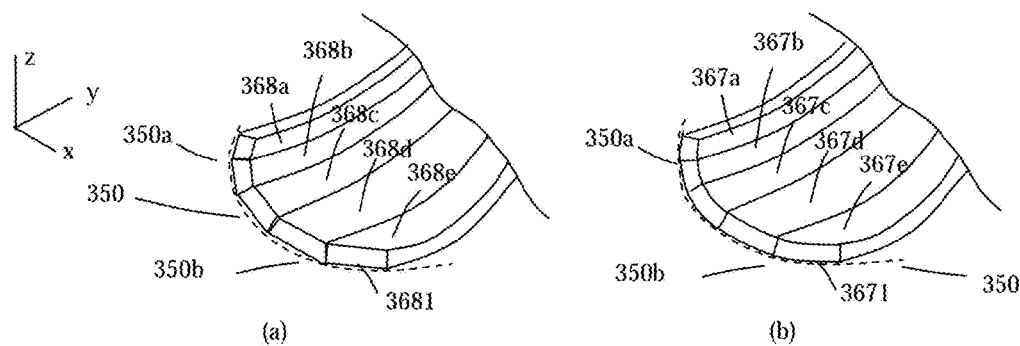
FIG. 6 depicts two methods to form a 3D thin-shell surface from joining ribbon-shaped materials together by this invention

For example, FIG. 6(a) depicts a 3D thin-shell surface comprising 5 ribbon-shaped materials joined together (368a-e). 350 indicates the cross-sectional curve of an ideal smooth 3D curved surface. The curvature on one side (350a) is larger than that on the other side (350b). When this surface is fabricated using the current invention, the side with smaller curvature can be made by dispensing and joining wider ribbon materials, such as 368d and 368e, whereas the side with larger curvature requires ribbon materials of smaller width, such as 368a and 368b. Wider ribbons correspond to faster build rate, which speeds up the whole fabrication process. Accordingly, this feature allows maximization of material dispensing rate based on local geometry.

There are at least 2 methods to adjust width and thickness of dispensed materials. The first method adjusts the orientation of the dispensing head together with the material flow rate to change size of cross-sections of dispensed materials. The second method applies a dispensing head with an adjustable exit. Details will be described in later texts.

Still further, this invention includes a differential molding means, which applies a solid or fluid means in contact with selected positions on dispensed material while it is solidifying, to restrict the flow of and to shape the solidifying material. By this means, good surface finish can be obtained. A further variation of this means can create curvature in the direction along the width of a ribbon-shaped dispensed material, in order to match curvatures of local geometries. For example, in the 3D thin-shell surface depicted in FIG. 6(a), if the ribbon-shaped dispensed materials have rectangular cross-section, as illustrated as 3681, then the fabricated surface will not completely match the ideal cross-sectional curve 350. However, as illustrated in FIG. 6(b), if the dispensed ribbon-shaped material can be made to have curvature along its width direction, then every band (367a-e) can be made to match the local curvature of the ideal cross-sectional curve 350, and the fabricated object will have 3D curvatures closely matching the ideal smooth 3D curved surface.

Differential molding by solid means applies a small solid surface (called "differential mold") in contact with selected portions of the dispensed material while it is solidifying, to restrict the flow of and to shape the solidifying material. This solid means further comprises mechanisms to change curvature in the width direction of the dispensed solidifying material. Differential molding by fluid means applies different pressures generated from fluid flows to achieve similar effects. Details are to be described in later texts.

Combining a motion mechanism capable of multiple-DOF flexible 3D paths, a material dispensing head that can adjust the size of dispensed material, and a differential molding means that can shape curvature of the dispensed material in the width direction, fast fabrication of 3D curved surface can be realized. As illustrated in FIGS. 3(a) and 3(b), each of the ribbon-shaped structures depicted by different tones of gray (318a, 318b, 318c, and 318d) represent one band of ribbon-shaped material dispensed by the dispensing head in a single pass. For example, the light gray band structure 318c is formed by a dispensing motion that basically sweeps a curve PQ along the direction of arrow 390. This maximizes material deposition rate.

Accordingly, this invention includes the following procedure of fabricating a 3D article:

(1) Analyze the geometric shape and the requirements (such as surface finish, material forming direction or strength requirements etc.) of different portions of the 3D article and make a process plan. This process plan divides the geometric data of the 3D article into a number of zones and sets an order of sequence of fabrication of these zones.

(2) Based on the process plan, disassemble the geometric data of the 3D article and generate a collection of Component Geometries that can be recombined to form the shape of the 3D article. The so called Component Geometries include geometric volumes of bands (ribbons), wires (lines) and dots (points). Further identify and select zones that require good surface finish and then disassemble and convert these selected zones into collections of band and wire Component Geometries.

(3) For each Component Geometry generated in step (2), determine a corresponding set of forming parameters (including thickness, width, curvature and dispensing trajectory).

(4) For each set of forming parameters generated in step (3), determine a set of process parameters, including material feed rate, ambient conditions (such as temperature), material dispensing rate, dispensing head speed etc.

(5) Following the sequence determined in the process plan, dispensing material to form each Component Geometry. The forming method for each Component Geometry is to move the material dispensing system (including the dispensing head and the differential molding means) along the dispensing trajectory, relatively, and dispense solidifiable material according to the corresponding set of forming parameters.

By forming each Component Geometry in sequence, all the Component Geometries combine to form the 3D article.

Under proper situations, the dispensing head capable of adjusting exit size and the differential molding means for curvature formation do not need to be applied together. For example, the 3D thin-shell curved surface of FIG. 6(a) can be fabricated without using the differential molding means for curvature formation.

In the broadest sense, the solidifiable material of this invention includes any material that has a fluid state and can be converted into a solid state under specific environmental conditions.

For example, many polymers exhibit the property. Most thermoplastics exhibit fluid state at elevated temperatures and solidify at lower temperatures. Typical examples include Nylon, PMMA and polystyrene (PS) such as ABS etc. Wax is another material that exhibits the property depending on temperature. Wax is another material that exhibits the solidifiable property based on temperature.

Polymer materials can be dispensed by extruding, which corresponds to plastics extrusion processes in traditional bulk plastic processes, or by jetting (Injection from fluid state), which corresponds to injection molding.

Photo-curable polymers, such as photoresist and liquid photo-lithographical polymer used in the SLA process, can also be used. In this case, the environmental condition that solidifies the polymers is mainly exposure of light, especially UV light.

The solidifiable materials can be metals, which exhibit the solidifiable property based on temperature. In analogy to traditional bulk processes, such as casting, continuous casting and fusion welding, molten metal can be dispensed from a dispensing head, such as a tundish with a nozzle, and then be allowed to cool down and solidify. Molten metals, especially those of lower melting points, can also be dispensed by injection, in analogy to metal injections applied in die casting. Another method to dispense molten metal is to shoot metal droplets.

Another form of solidifiable materials includes pastes, that is, the mixture of fine solid particles and a liquid state carrier. For example, in the prior art of the process of metal injection molding, metal particles are mixed with a fluid carrier made of polymer and wax at an elevated temperature. This mixture is then injected into a mold and cooled down and becomes a solid. The wax and the polymer are then removed in a melting and burning process, leaving a green part composed of metal powder, which is then sintered. In the current invention, a similar mixture of metal powder with wax and polymer in fluid state at elevated temperature can be used as the solidifiable material and temperature can be used as the main control of environmental condition. Solid parts can be dispensed by extrusion or by injection and be built up in the manner described previously. The same processes of wax/polymer removal and sintering can then be applied to make the final solid metal parts.

Another example of paste includes ceramic slurry, which is basically a mixture of fine ceramic powder with water and binders. The mixture can be dispensed and built up in the manner described previously. Depending on the fluidity and viscosity of the mixture, the material can be dispensed either by jetting (injection), if the fluidity is high and viscosity is low, or by extrusion, if the fluidity is low and the viscosity is high. Simultaneously with the dispensing, a flow of heated air can be applied to the dispensed material at the target zone to quicken the drying process. A green part can thus be formed. The green part can then be sintered into a solid ceramic part.

Still another example of paste is concrete.

Another form of solidifiable material is glass. It can be extruded and temperature can be used as the main environmental control to solidify it.

A variation of this invention is to dispense a joinable material in particulate form and simultaneously apply a joining means to the material dispensed at the target area such that the dispensed particulate material starts to join into an integral material. For example, metal or plastic powders can be used as the particulate joinable materials and a localized heating, which can be provided by a laser or an electric arc, can be used as the joining means. The dispensed powder is partially or fully melted by the localized heating and then, when out of the localized heat, cools down and re-solidifies into an integral part. For another example, a separate localized dispensing of binder material to the dispensed powder can be used as the joining means. Various binder materials used in processes such metal powder injection molding or ceramic powder molding can be used to join metal and ceramic powders.

A system of this invention includes a material dispensing head, a motion mechanism of multiple-DOF, which can generate flexible 3D paths between the dispensing head and the base, a material supply system that can control material feed rate and an ambient condition control system. It can further include a differential molding means that can shape curvature of the dispensed material in the width direction. The processing method includes the process plan mentioned previously, the process of disassembling geometric data, the process of generating the forming parameters and processing parameters, as well as the procedure of controlling the operation of the material dispensing head and the differential molding means, and the procedure of controlling the multi-DOF motion mechanism. Examples of embodiment of the invention are further described below.

EXAMPLE 1

Molten Metal as Solidifiable Material, 3D Freeform by a Casting Based Means 1.1 the Material Dispensing System FIG. 7(a) illustrates an example embodiment of a material dispensing system for metal, which includes a material supply unit 402, a dispensing head 403 and an optional differential molding means 420. FIG. 7(b)-(c) illustrates its cross-sectional views from side. The material supply unit 402, which includes a heating means (such as induction heating or electric arc heating) and a material feeding means (a metal wire powder can be used), sends the material into the dispensing head 403. The dispensing head includes a material cell 404 with an exit 405 at the lower end. A heating means outside of the material cell keeps the metal in molten state 480. A material not reactive to the molten metal is preferred for making the material cell. For example, aluminum oxide, graphite or other high temperature ceramics can be used to contain molten steel. Ceramics can also be used for metals of high melting points, such as titanium, cobalt, chromium and nickel alloys. Steel cells can be used to contain molten copper, aluminum can be used for molten tin; whereas molten aluminum can use titanium, titanium coated with boron nitride, or steel coated with nitralloy. The molten metal can flow out of the exit under the effect of gravity. Alternatively, a gas pressure from the top of the material cell can push the molten metal out of the exit. The actual size of the material cell and the exit depends on size of the 3D article to make, dimensional tolerance and materials.

Figure 8:
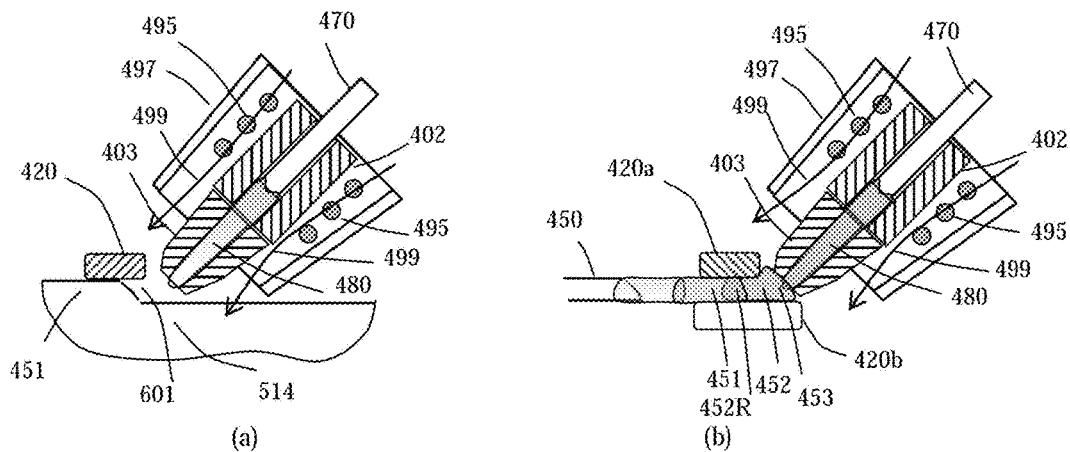
FIG. 8 illustrates another example of the material supply unit in cross-sectional view, using an induction heating means to melt a metal wire, and operation of the differential molding means in this invention.

FIG. 8 illustrates a different example of the material supply unit 402 in cross-sectional view, wherein an Induction heating means 495 melts a metal wire 470. The solid metal wire 470 is fed from rear end and can push and retract the molten metal 480 at the front like a piston. The material supply unit, the dispensing head 403, and the heating means are packed inside a casing 497 and an inert gas 499, such as argon or $CO_2$, blows through the casing to cover the whole system including the material dispensing and solidification area to prevent oxidation of metal.

Figure 7:
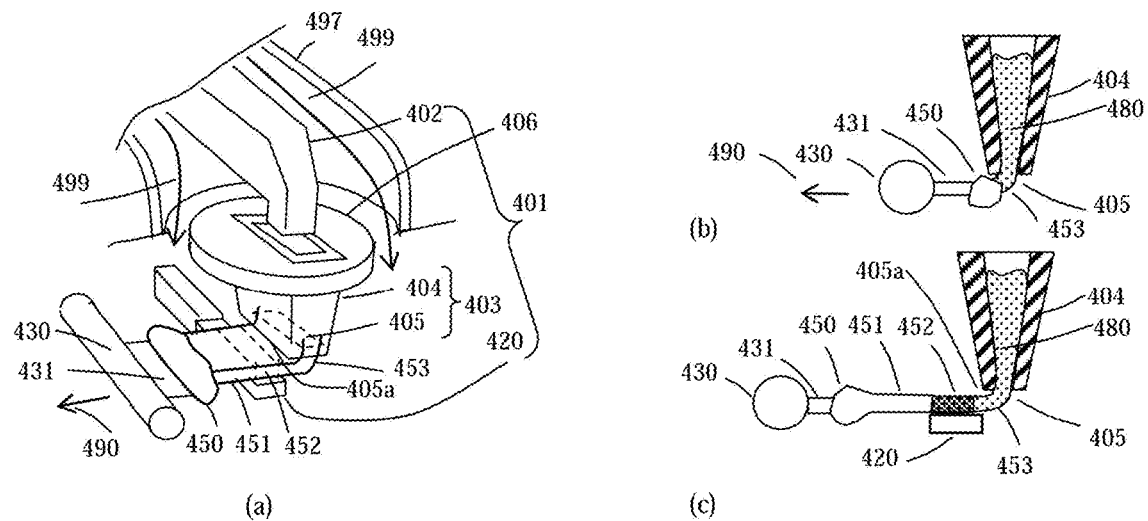
FIG. 7(a) illustrates an example embodiment of a material dispensing system for metal in this invention; (b)-(c) illustrates its cross-sectional views from side.

As the molten metal flows out of the exit, it forms a droplet attached to the outside of the exit due to surface tension. By touching the droplet with the base (or solidified material on the base), the temperature of the droplet decreases due to thermal conduction and solidification starts. FIG. 7 and FIG. 8(*b*) depict the initial stage of the material dispensing process, the metal droplet touches a metal plate 431, which is attached to the base (metal frame 430) and is used as a starting point of the forming process. The base 430 together with the starting metal plate 431 then act as a heat sink and the metal droplet starts to solidify from the contact position 450 at the starting metal plate. The ambient condition control unit (not shown) controls the temperatures of the base and the starting metal plate within a proper range and the heating means around the material dispensing head 403 sets the temperature of the molten metal at an elevated, proper range. When the base with the starting metal plate moves along the direction indicated by arrow 490, the metal can be dispensed, formed and solidified in a manner similar to continuous casting. Metal 453 close to the exit of the dispensing head is in molten state. A little away from the exit, there is a short solidification zone 452 wherein the molten metal solidifies. Further away from the exit and the solidification zone, solidified metal forms a band-shaped solid 451, which extends to the initial solidification point 450. Because of the effect of surface tension, as long as the temperatures and the speeds of motion and material supply are properly controlled, molten metal will flow out of the exit and follow the solidification path without dripping down. In the situation shown in FIG. 8(*a*), molten metal is dispensed onto the surface of previously dispensed and solidified metal 514, which also becomes a part of the heat sink.

1.2 Motion System

Figure 13:
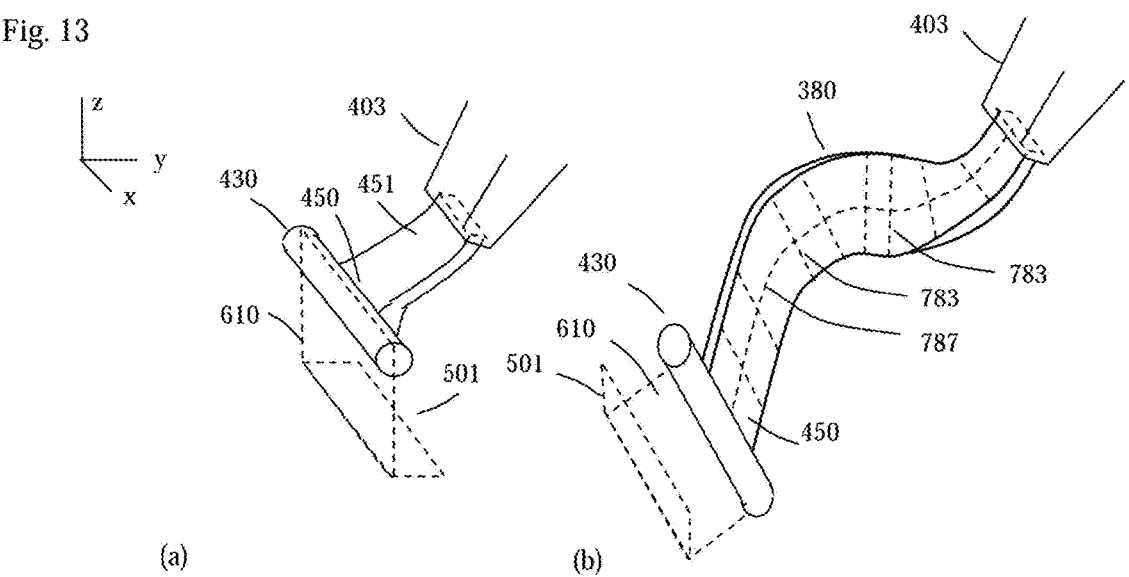
FIG. 13 illustrates forming of an arbitrarily twisted ribbon shape by relative motions between the base and the dispensing head in this invention.

A motion system with multiple degrees of freedom is used to provide relative motion between the material dispensing head and a base member. This part has been described in previous sections related to FIG. 4 and FIG. 5. For example, as shown in FIG. 13, the base member (metal frame 430) is attached to a structure 610 on the base 501 of a motion system. By relative motions between the base and the dispensing head 403, a surface of arbitrarily twisted shape 380 can be made.

Figure 9:
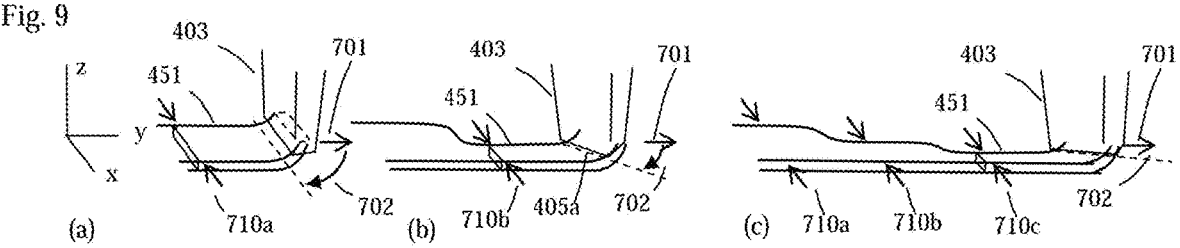
FIG. 9 illustrates an example method of adjusting cross-sectional size of dispensed material during dispensing by adjusting dispensing head orientation in this invention.

1.3 Systems and Methods for Adjusting Cross-Sectional Size of Dispensed Material The first preferred method of adjusting cross-sectional size of dispensed material during dispensing is to adjust the angle of the dispensing head relative to the track of dispensing motion and adjust material flow rate. As depicted in FIG. 9, changing the angle 702 of the leading edge 405*a* of the exit of the dispensing head relative to the motion direction of dispensing 701, with matched adjustment of material flow rate, band-shaped materials of the same thickness but different widths can be dispensed, as illustrates at 710*a*, 710*b* and 710*c*. Depicted in FIG. 10, reorient the dispensing head and changing the angle 703 of the leading edge 405*a* relative to the vertical direction, with matched adjustment of material flow rate, vertical wall-shaped materials of the same thickness but different heights can be dispensed, as illustrated at 711*a*, 711*b* and 711*c*.

Figure 11:
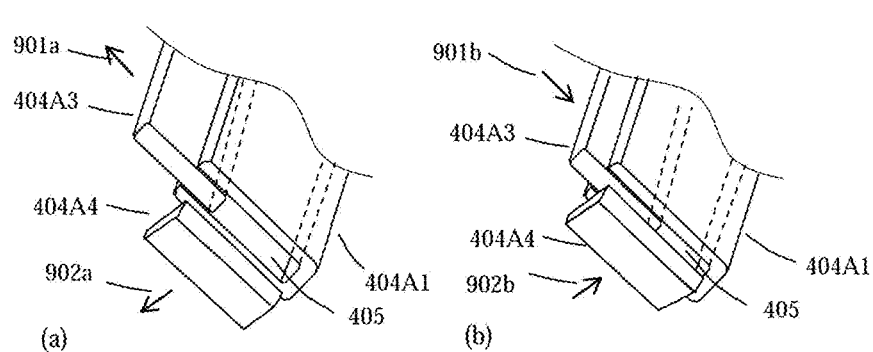
FIG. 11 illustrates an example approach of adjusting cross-sectional size of dispensed material during dispensing by adjusting dimension of the exit of the dispensing head in this invention.

The second preferred method of adjusting cross-sectional size of dispensed material during dispensing is to use a gating mechanism to adjust the dimension of the exit of the dispensing head. FIG. 11 depicts one example design of the material dispensing head with adjustable exit size. The material-containing cell 404 in this design includes 3 main parts: a U-shaped main body 404A1, a side-slab 404A3 that inserts into and slides in the main body and an exit lip 404A4 that slides over the exit 405. (Restraining structures and bearings of the sliding mechanisms are not shown.) Pulling the slide slab along arrow 901*a* increases the length of the exit 405 and moving the exit lip along arrow 902*a* opens the exit to the maximal size, as illustrated in FIG. 11(*a*). Pushing the slide slab along arrow 901*b* decreases the length of the exit 405 and moving the exit lip along arrow 902*a* reduces the exit to the minimal size, as illustrated in FIG. 11(*b*).

Figure 12:
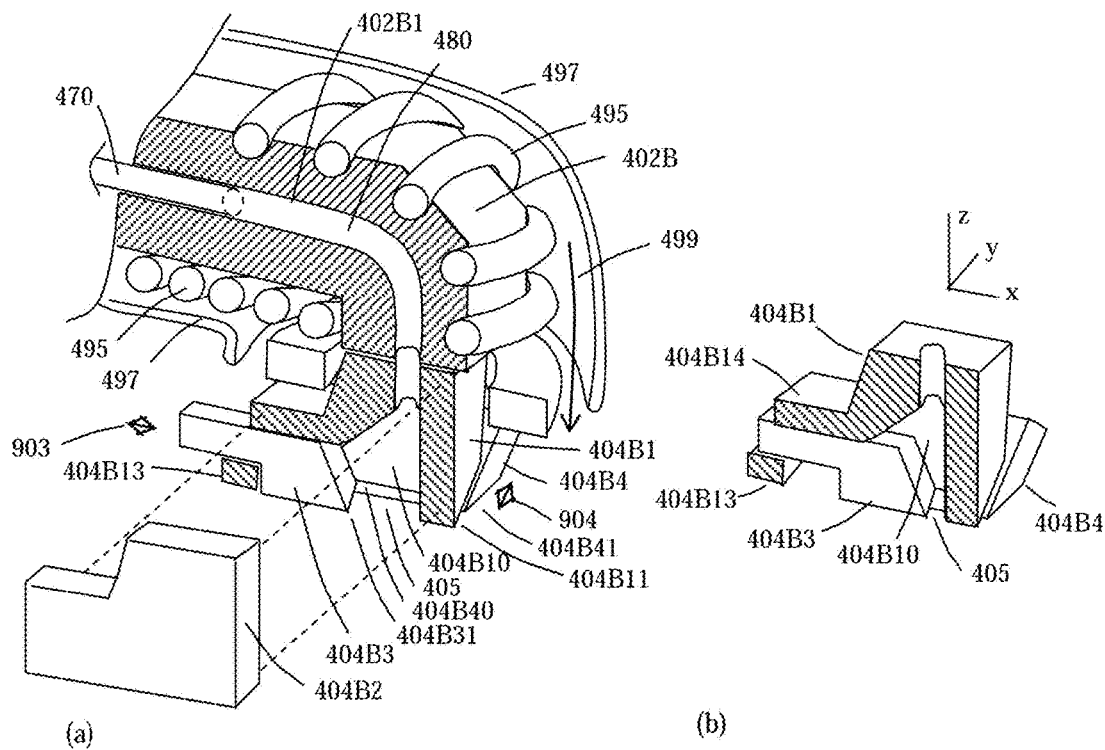
FIG. 12 illustrates another example approach of adjusting cross-sectional size of dispensed material during dispensing by adjusting dimension of the exit of the dispensing head in this invention.

FIG. 12(*a*) depicts, in exploded view, another example design of the material dispensing head with adjustable exit size. The material-containing cell 404 in this design includes 4 main parts: a main body 404B1, a side-slab 404B3, a cover 404B2 that covers the main cell space 404B10 and the side-slab, and an exit lip 404B4 that slides over the exit 405. The side lab is basically restrained on 5 surfaces by the cover, the main body, two restraining structures 404B13 and 404B14 of the main body and the tip edge of the exit lip at 404B40. Therefore, the side slab can slide linearly along arrow 903. Restraining structures for the lip 404B4 can be of a similar design and is not shown. Similar to the design of FIG. 11, the exit 405 is also opened and closed by the sliding motions of the slide slab 404B3 and the lip 404B4. When the slide slab is pushed to the right along arrow 903 and the lip is pushed down along arrow 904, the exit is closed down, as shown in FIG. 12(*b*). Near the exit 405, the tip edges of the main body, the side slab and the lip are shaped into wedge-shapes, as depicted at 404B11, 404B31 and 404B41. This way, the exit opening 405 can always be kept at the lowest position of the assembly of the dispensing head. The possibility of mechanical interference or collision between parts of the dispensing head and the solidified workpiece can be minimized.

The designs illustrated in FIG. 11 and FIG. 12 basically apply the principle of adjusting the area of the exit 405 from two different directions (specifically, perpendicular directions) by two independently adjusted gating members. This way allows the exit opening to be smoothly adjusted between a large maximal size and a very small minimal size.

Figure 27:
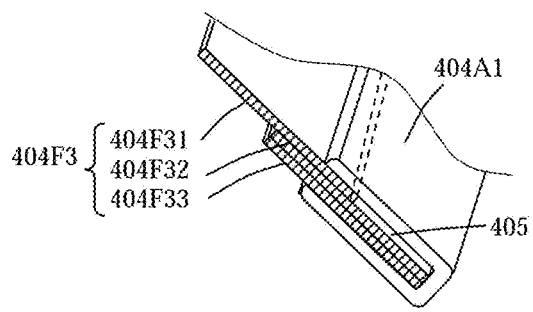
FIG. 27 illustrates still another example approach of adjusting cross-sectional size of dispensed material during dispensing by adjusting dimension of the exit of the dispensing head in this invention.

FIG. 27 depicts another example design of the material dispensing head with adjustable exit size. Compared to FIG. 11, this design uses multiple side-slabs stacked together 404F3, without an exit lip. By moving and positioning each side-slab (404F31, 404F32 or 404F33) independently, the size of the exit 405 can be adjusted discretely in thickness direction but continuously in width direction.

Figure 28:
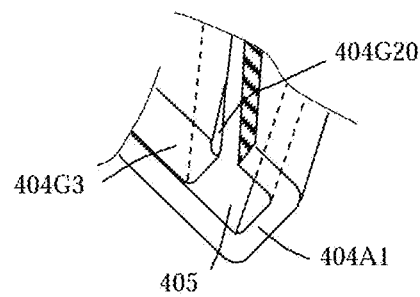
FIG. 28 illustrates still another example approach of adjusting cross-sectional size of dispensed material during dispensing by adjusting dimension of the exit of the dispensing head in this invention.
Figure 28:
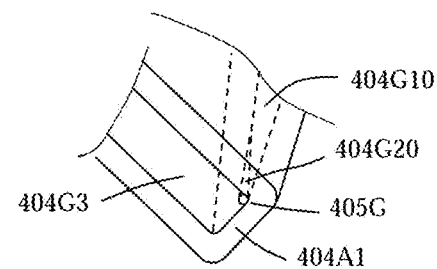

FIG. 28 depicts another example design of the material dispensing head. It uses a single side-slab 404G3 that has a recess feature 404G20 on its leading edge. When the slab is positioned to fully-closed position, this recess feature and the inside wall of the main body 404A1 form a nozzle structure with the cell space 404G10 at back and the orifice 405G at the exit face, for dispensing materials in wire- and filament-shapes.

The contacting surfaces between the main body and the side-slab (or the lip) need to have two functions: bearing function for sliding motion and sealing function for preventing liquid metal from leaking out. The bearing material can include graphite, ceramics such as aluminum oxide, silicon nitride, silicon carbide. Cast iron, brass, Nitralloy and Zerodur can also be used if the solidifiable material used is a non-ferrous metal.

For non-wetting sliding surfaces, surface tension of the molten metal will basically prevent itself from seeping into the sliding interfaces. Further, the material feeding involves a pressure only slightly above normal atmospheric pressure. Therefore, leaking is generally not a major concern.

1.4 Differential Molding Means

The material dispensing system can further include a differential molding means, which applies a small solid means (called differential mold) in contact with selected positions on dispensed material while it is solidifying, to restrict the flow of and to shape the solidifying material to obtain desired cross-sectional shape. By this means, good surface finish can be obtained. Curvature in the direction along the width of a ribbon-shaped dispensed material can also be made by this means.

As depicted in FIG. 7, by placing a small solid surface 420 underneath the solidification zone 452, this solid surface together with the leading edge of the exit 405a forms restrictions on both sides of the dispensed material so that the dispensed material solidifies into a band (ribbon) shape. The differential mold 420 can also be applied to the top side of the solidification zone to make the top surface of the dispensed material smooth. FIG. 8(a) illustrates this situation. Part of the surface of the differential mold 420 touches previously solidified material at 451, a small cavity 601 is formed by the remaining part of the differential mold surface together with restricting surfaces of previously dispensed and solidified materials at 451 and 514. The dispensing head dispenses material to full this cavity. The newly dispensed material solidifies. Then the differential mold and the dispensing head move to the right to begin the next dispensing step. FIG. 8(b) illustrates the situation when two differential molds are applied to opposite sides of dispensed material. Upper differential mold 420a and lower differential mold 420b together with previously solidified material 451 form a small cavity for receiving dispensed molten metal 452. In principle, in order to have good bonding between newly dispensed material and previously solidified material, a small portion of the previously dispensed material needs to be re-melted and then re-solidified together with the newly dispensed material, as indicated by 452R. By moving the upper and the lower differential molds together with the dispensing head, long, band-shaped solid can be formed.

Figure 14:
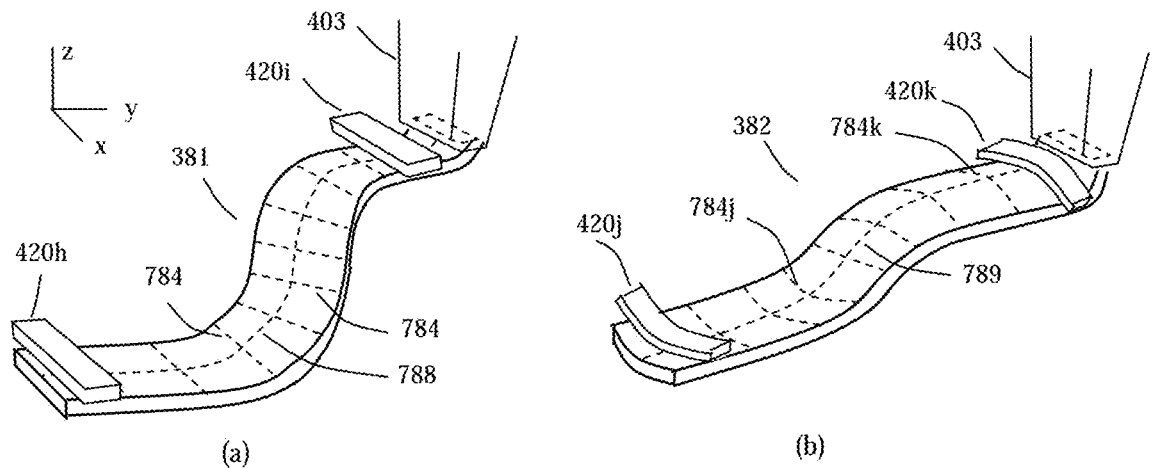
FIG. 14 illustrates examples of operation of the differential molding means in this invention.

In general, the longitudinal direction of the differential mold is parallel to the solidification front of the melt and perpendicular to the track of the dispensing. Therefore, when a flat surface is used as the differential mold, a solid band (or ribbon) can be formed and the surface of the band in its transverse (width) direction is flat. This is illustrated in FIG. 14(a). Curved band 381 is formed by moving a differential mold from location 420h, together with the operating dispensing head 403, to location 420i. The track of dispensing is indicated by the dashed curve 788, which is generated by the multi-DOF motion mechanism. In the transverse (width) direction, indicated by dash lines 784, the surface of the band is flat (straight line). Such bands can still be joined to approximate a 3D curved surface, as shown in FIG. 6(a).

If the differential mold is made to be able to change its curvature along its length direction, then band-shaped geometry having curvature in its traverse (width) direction can be formed. As illustrated in FIG. 14(b), curved band 382 is formed by moving a differential mold from location 420j, together with the operating dispensing head 403, to location 420k. The track of dispensing is indicated by the dashed curve 789. In the transverse (width) direction, as illustrated, initially the differential mold is made to curve upward 420J so the surface has a positive curvature (or bending upward) as indicated by dash lines 784j. In the later stage of dispensing, the differential mold is made to curve downward 420k so the surface has a negative curvature (or bending downward) as indicated by dash lines 784k. As a result, combining this curvature capable differential mold with the multi-DOF motion mechanism, band-shaped geometry with curvatures in both directions (along the dispensing track as well as its transverse (width) direction) can be formed. 3D surfaces of almost arbitrary curvature can be formed by joining bands with variable curvature in both directions, as illustrated in FIG. 6(b). In FIGS. 14(a) and (b), the differential molds are depicted on top of the dispensed material stripes (381, 382). They can also be under the dispensed material or on both the top and the underside of the dispensed material, depending on situations and needs, as described in previous paragraphs.

It should be noted that the so called "minute size" of the differential mold is measured relative to the size of the object to be fabricated, rather than by an absolute standard.

Figure 15:
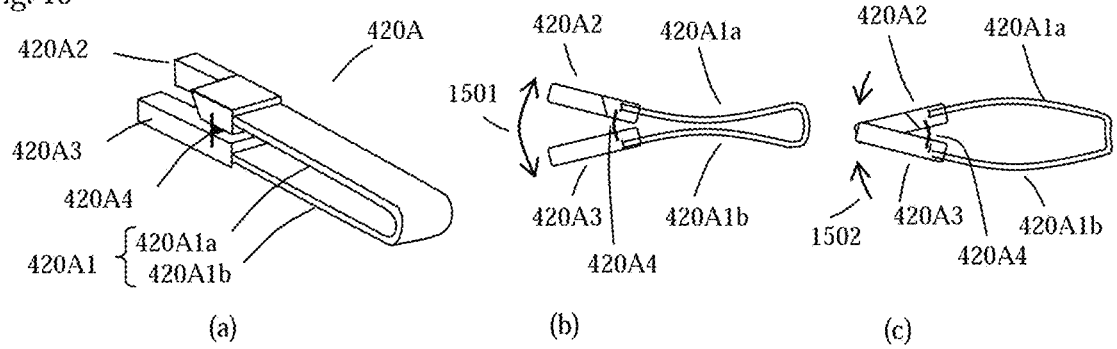
FIG. 15 illustrates an example design of the differential molding means based on material deformation in this invention.

The differential mold that can change curvature along its longitudinal direction can be constructed by at least two approaches. The first approach applies a deformable member and an actuation means that changes the curvature of the member. FIG. 15 depicts one example by this method, which mainly comprises two bendable foils. These two deformable foils can be the two parts (420A1a. 420A1b) of a single U-shaped foil 420A1, as shown in FIG. 15(a). Two handles (420A2, 420A3) are attached to the separate ends of the two foils and are connected at a pivot 420A4. When a force opens the handles, as illustrated in FIG. 15(b) at 1501, both foils bends inward and become concave. When a force closes the handles, as illustrated in FIG. 15(c) at 1502, both foils bend outward and become convex. The curvature of the foil surfaces can be controlled by adjusting the extent of opening (or closing) of the handles. The open and close of the handles can be actuated by a suitable mechanism such as two co-axial worm gears of opposite spiral directions (not shown). This differential mold can be applied to the top surface of dispensed material by using the lower foil

420A1b, or to the underside surface of the dispensed material by using the upper foil 420A1a.

Figure 16:
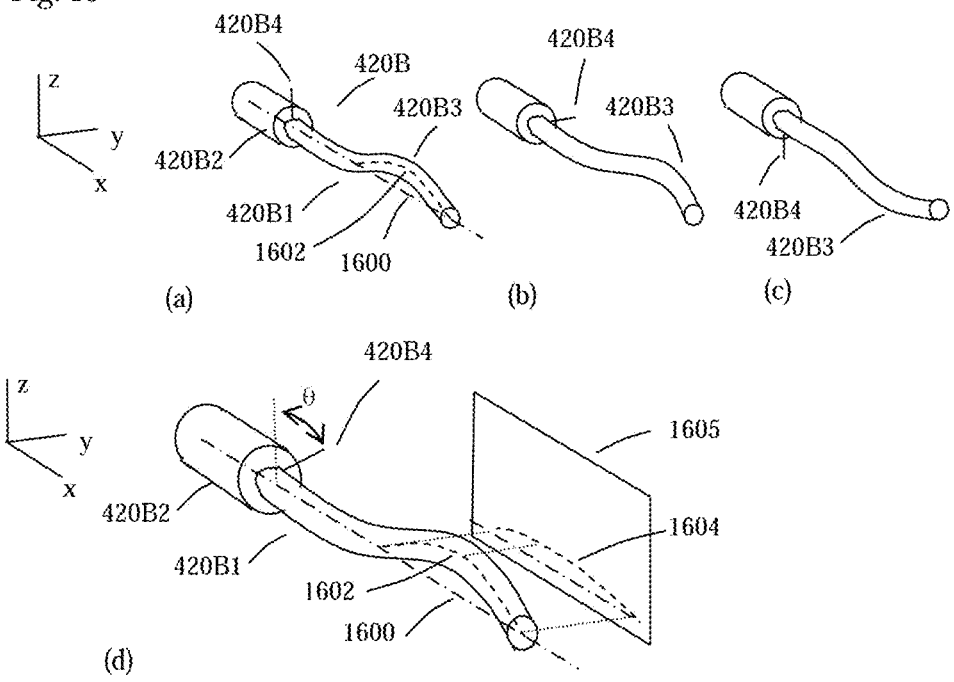
FIG. 16 illustrates another example design of the differential molding means based on non-deformable shapes in this invention.

The second approach uses a curved, non-deformable member and makes use of different portions on the member, each portion having different curvature, to make contact with dispensed material to meet the required curvature. FIG. 16 illustrates one example of this approach, which Includes a rotatable curved rod. The curved rod 420B1 is attached to a shaft 420B2, which is rotatable about axis 1600. For convenience of description, axis 1600 is oriented as parallel to the x-direction. The rod has a curved section that deviates away from axis 1600 toward one direction indicated by a marker 420B4, with the largest deviation at 420B3. When a dispensed material passes over the upper surface of the curved section of the rod in transverse direction, i.e. along y-direction, then depending on the orientation of the rod with respect to the rotational axis 1600, the contacting surface between the rod and the underside of the material will have different curvatures.

For example, in FIG. 16(*a*), the marker 420B4 points toward z-direction, indicating that the peak point of the curve 420B3 also points toward z-direction. Thus, the curved section of the rod acts as a differential mold of convex surface to the underside of the material and the curvature is equal to the curvature of the rod's curved section along x-direction. If the rod rotates so that the marker 420B4 points 90 degree away from z-direction, as shown in FIG. 16 (*b*), then the peak of the curved section 420B3 points toward y-direction. That is, the curved rod now basically lies flat on a plane parallel to the x-y plane. Its top surface is basically also flat with respect to z-direction. As a result, the rod acts as a differential mold of flat surface to the underside of the material. If the rod rotates so that the marker 420B4 points 180 degree away from z-direction, as shown in FIG. 16 (*c*), then the peak of the curved section 420B3 points toward −z direction. The rod acts as a differential mold with a concave surface to the underside of the material. Note that when the angle between the marker 420B4 and the +z direction is 0 or 180 degree, the rod has maximal curvature in the z-direction, convex or concave.

FIG. 16(*d*) depicts a general case when the rod rotates to an angle θ with respect to z-direction. To a dispensed material passing over the upper surface of the curved section of the rod in transverse direction, i.e. along y-direction, the curvature it experienced can be obtained from the projection of the rod curve 1602 onto the x-z plane 1605, as shown as curve 1604. The angle of rotation θ thus controls the curvature of the differential mold. The rotation can be actuated through a suitable mechanism such as a rack and pinion system (not shown). This differential mold can be applied to the top surface or to under-surface of the dispensed material.

Figure 17:
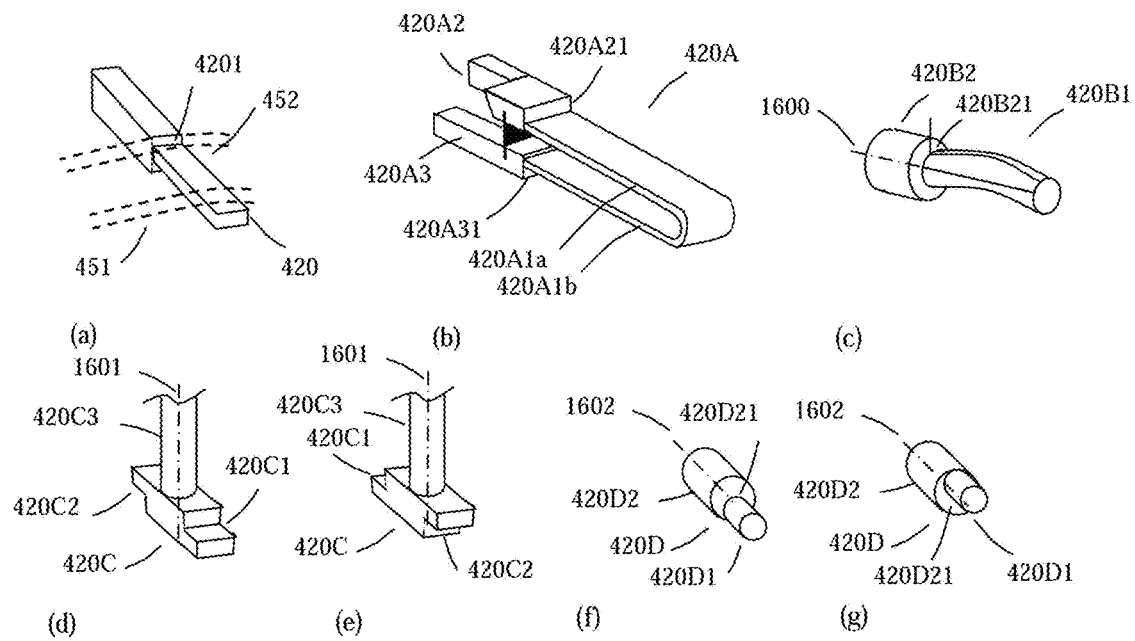
FIG. 17 illustrates an example design of the differential molding means for controlling dimension of width of dispensed material in this invention.

In order to control dimension of width of the dispensed material, the differential mold can include edge shaping features. FIGS. 17(*a*), (*b*) and (*c*) illustrate a few examples of differential molds having a small perpendicular edge (4201, 420A21 or 420B21) relative to the differential molding surface. This small vertical edge 4201 can restrict the material 452 in the width direction during solidification, when the main differential mold surface is on the top of or under the material. When forming thin structures of an object, such as the blades of FIG. 1, the edges can be shaped and trimmed as a final step after the main portion of a blade is formed almost to the final dimension. The edges can then be formed with the help of an edge shaping mold that shapes only the edges but not the main surfaces of the blade. FIG. 17(*d*)-(*e*) illustrates one such example of edge shaping differential mold. The end 420C1 has a step structure that can be applied to the underside of edge of a structure, while the opposite end 420C2 has a similar but upside down step structure, which can be applied to the topside of edge of a structure. By rotating the device about axis 1601, the two opposite ends can be selected as needed. FIG. 17(*f*)-(*g*) illustrates another example of edge shaping differential mold. This example has a short post 420D1 eccentrically attached to a shaft of larger diameter 420D2. The joining area 420D21 forms edge shaping surfaces. Rotation of the shaft 420D2 can place the short post at bottom, as shown in FIG. 17(*f*), or at top, as shown in FIG. 17(*g*), or at any other angle relative to the center axis 1602.

In general, materials used for making the material cell 404 can also be used to make the differential mold, especially those made of non-deformable members. For examples, ceramics, carbon and their composites can be used to make the curved bars of FIGS. 16 and 17. Ceramics can be used for metals of high melting points, such as steels, titanium, cobalt, chromium and nickel alloys. For differential molds based on deformable members, graphite sheets and metals can be used. Steels can be used for molten copper. Steels coated with Nitralloy can be sued for aluminum alloys. Aluminum can be used with tin. For handling molten steels, except graphite, metals of melting point higher than steel may also be used, such as refractory metal tungsten and molybdenum. These metals do form alloys with iron at elevated temperature. To avoid this, the metal surface can be coated with a thin layer of alumina by plasma spray technique, so that the alumina layer shields the metal base from direct contact with the molten steel. In metal coating industry, alumina coated refractory metal foils as thin as 0.01 mm have been used as "alumina coated boats" as evaporation sources. (For example, see products of Megatech of Cannock. Staffordshire, England, http://www.megatechlimited-.co.uk/29-alumina-coated-boats). Such a thin foil can also provide the deformability required for curvature adjustment.

Figure 18:
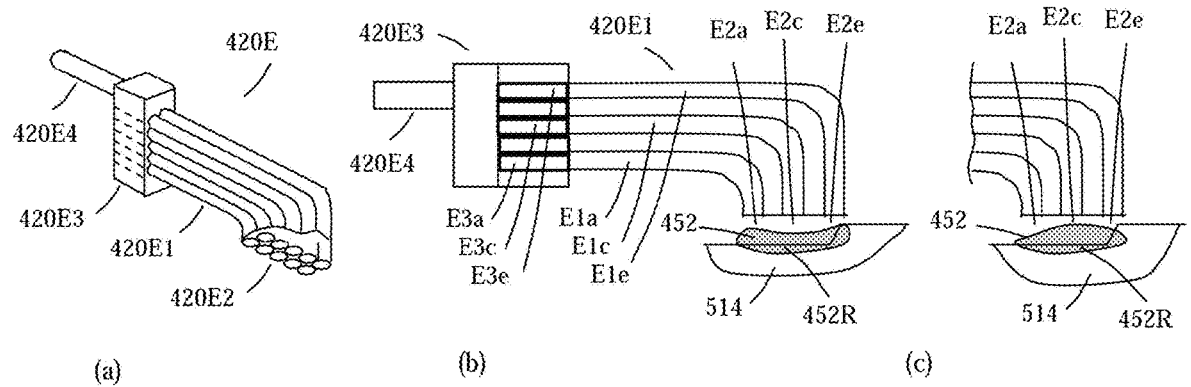
FIG. 18 illustrates another example design of the differential molding means based on fluid flow and pressure in this invention.

The differential mold can also be based on the principle of fluid flow and pressure. The basic concept is to apply multiple channels of gas jets over the dispensed molten metal in the solidification zone and shape the surface of the molten metal by adjusting the flow speeds and pressures of different channels. An example system is depicted in perspective view in FIG. 18(*a*) and in cross-sectional view (sectioned along the width direction of the dispensed material) in FIGS. 18(*b*) and (*c*). The system includes a bundle of small diameter tubing 420E1. The exhaust end of the tubing bundle forms an array of gas outlets 420E2, which is to be placed over the top of the dispensed molten materials in the solidification zone. The Inlets end of the tubing connects to a manifold 420E3, which is supplied with an inert gas from inlet piping 420E4. In the manifold, each tube in the bundle is connected to a different controllable flow restricting device. For examples, tube E1*a* is connected to restricting device E3*a*, and tube E1*b* to device E3*b* etc. The flow restricting device can be controlled through a mechanical or electro-mechanical mechanism, such as a piezo-electric actuator, so that the flow rate in the corresponding tube can be adjusted. When the array of gas outlets 420E2 is placed slightly off the top surface of the dispensed molten materials 452 in the solidification zone, the gas flow pushes the metal surface and forms a small gap. A higher flow rate in a tube will result in a higher pressure, and a larger gap, between the corresponding tube outlet and the molten metal surface and a larger gap. A lower flow rate will have a reverse effect. By adjusting different flow restricting devices, different flow rates in different tubes can be generated and different pressures can be provided over different parts of the molten metal surface, thereby shaping its cross-sectional profile. For example, in FIG. 18(b), flow rates in the central tubes, such as E1c, are higher than those in side tubes, E1a and E1e, resulting in higher pressure in the middle of the molten metal E2c. Thus, the metal surface is pushed down, forming a concave shape. FIG. 18(c) illustrates an example of reversed situation, wherein a convex profile is formed by supplying higher flow rate in side tubes, D2a and D2e, than in central tubes. Argon, $CO_2$ or other inert gas can be used. One advantage of this gas flow system is that the molten metal does not touch the solid part of the differential mold. Therefore, the tubing can be made from various kinds of metals.

When the size of dispensed molten metal is small, the effect of surface tension could surpass the effect of gravity and could cause problem in material dispensing and in the performance of the differential molds. In this case, the solutions include applying a pressure at the upstream of the molten metal (by a gas pressure or by a piston effect such as the one shown in FIG. 12) to "squeeze" the molten metal out and using upper and lower and even edge shaping differential molds simultaneously to confine the molten metal as it solidifies.

Figure 19:
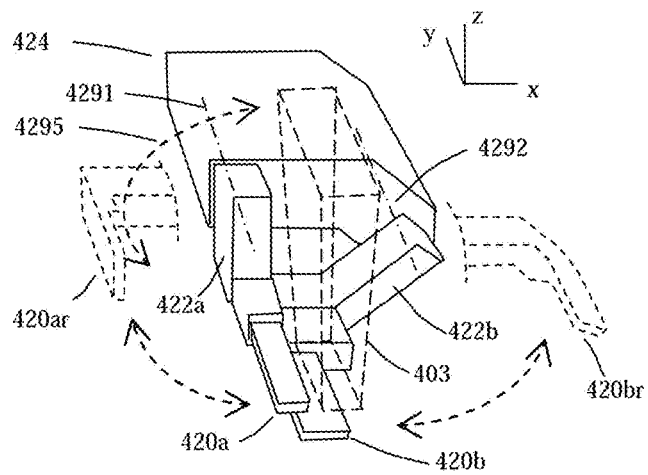
FIG. 19 illustrates an example design of mounting and retracting mechanism of the differential molds system in this invention.

FIG. 19 depicts an example design of the mounting and retracting mechanism of the differential molds system, with respect to the dispensing head 403, which moves toward +x direction (right) when it dispenses materials. The upper differential mold 420a and the lower differential mold 420b are connected to two arms (422a, 422b) respectively. Arm 422a is mounted to a base 424 at axis 4291. Arm 422a can rotate about axis 4291 and move the upper differential mold to operation position at 420a or to resting position at 420ar. Similarly, arm 422b can rotate about axis 4292 and move the lower differential mold to operation position at 420b or to resting position at 420br. Thus, the differential molds can be engaged or disengaged according to need. As described previously, the differential molds move together with the dispensing head relative to the dispensed material. In the case when the dispensing head needs to rotate about z-direction, the orientation of the differential molds can be adjusted accordingly by rotating the base 424 about z-direction, for example, along a track 4295 (rotary mechanism not shown).

The ambient condition control unit includes means for controlling the temperature of the atmosphere surrounding the material dispensing area, such as using an air conditioner or a fan, if necessary. It can also include means for controlling the temperature of the base or members onto which the dispensed material attaches. Such examples include passing cooling or heated fluids through internal passages in the base to control its temperature. Electric heat or heated air or inert gas can also be used over the material dispensing area or over the whole workpiece and its base. Whenever needed, the temperature of the differential molds can also be controlled by similar means. These means for controlling temperatures of the ambient, the base and the differential molds apply to different solidifiable materials, not limited to molten metal.

EXAMPLE 2

Plastics (Polymer Material) as Solidifiable Material, 3D Freeform by an Extrusion-Based Means 2.1 the Material Dispensing System The material dispensing system is similar to the system of FIG. 8. Metals, such as aluminum, copper or steel, can be used for the material supply unit 402 and the dispensing head 403. The heating means can heat up the metal and then the metal can heat up the plastic material. Inert gas protection is generally not needed.

2.2 Means for Changing the Width of Dispensed Materials

The means of changing the width of dispensed materials by using a dispensing head of adjustable exit size and the corresponding basic mechanisms, as depicted in FIGS. 11 and 12, also apply to plastic materials. However, due to differences in properties between plastics and metals, the internal shapes of the material supplying unit and the dispensing head are different.

In the case of metals, for example in FIG. 12(a), the flow speed of the molten metal 480 along the supply duct 402B1 in the material supply unit 402B could decelerate at entering the material cell 404B10, which has a cross-sectional area larger than that of the supply duct. But as long as the flow volume rate is kept constant along the flow path, the material cell can still be kept fully flooded and material dispensing rate can be maintained. That is, a single solid wire 470 acting as a piston to its melt in a supply duct of fixed cross-sectional area can provide various volume flow rates, by varying feed rate, to satisfy the need of dispensing of materials of different sizes (widths).

However, in the case of extrusion of polymers, melt must be accelerated steadily and there should be no dead spots (stagnation zones) along the flow path, according to know-how from traditional bulk extrusion processes (see W. Michaeli. *Extrusion Dies for Plastics and Rubber*, 2nd ed., Hanser, Munich, 1992, p. 190, which is incorporated herein for this current invention by reference). Therefore, shapes of internal duct, cell space and gating members as well as gating mechanism should be designed to have (1) continuous lines without steps or jumps and (2) always decreasing cross-sectional areas along the flow path, even between parts having relative movements. Two example designs are described below.

Figure 20:
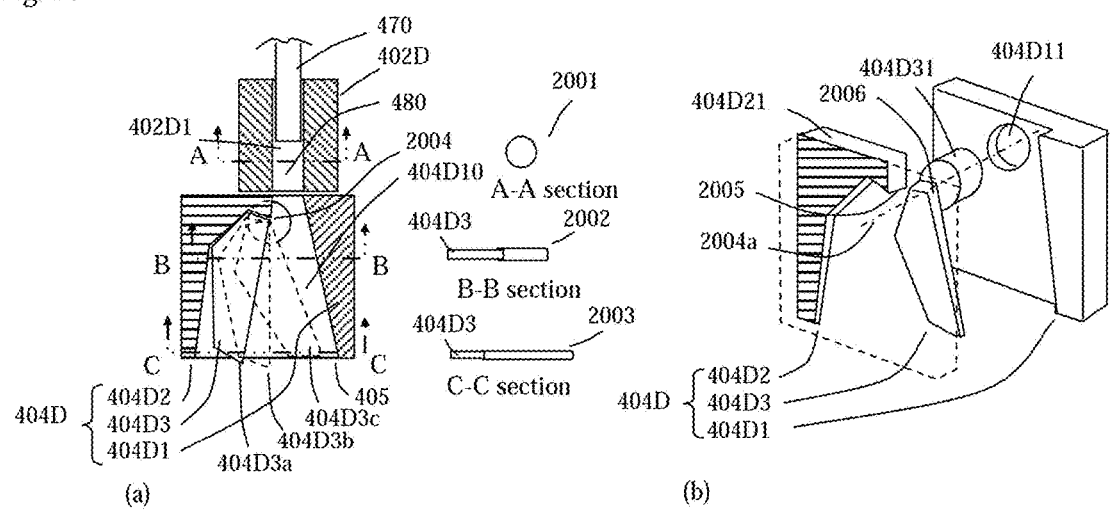
FIG. 20 illustrates still another example approach of adjusting cross-sectional size of dispensed material during dispensing by adjusting dimension of the exit of the dispensing head in this invention.

FIG. 20 depicts a first preferred system of the material supply unit and the dispensing head for polymer dispensing by extrusion. FIG. 20(a) shows cross-sectional views and FIG. 20(b) shows an exploded view. A wire of solid material 470 is fed into the material supply unit 402D via a duct 402D1 and is heated to become melt 480. The dispensing head includes a main body 404D1, a cover part 404D2 and a side-slab 404D3 for adjusting the size of the exit 405. The melt flows through the cell space (melt chamber) 404D10 and exits at exit 405. The cell space is confined at left by the side-slab, which can rotate about an axis 2004 (2004a) to open up (e.g. position 404D3a) or close down (e.g. position 404D3c) the exit. The side-slab includes a shaft structure 404D31 that sliding fits into a bore 404D11 on the main body to allow such rotation. The cover part 404D2 has a raised structure 404D21 that, when the system is assembled, forms the space for the cell space and the space for motion of the side-slab. The leading edge of the raised structure at 2005 touches the top edge of the side-slab at 2006, forming a contacting line and a mechanical seal so that the melt will be confined in the cell space and will not flow to the back of the side-slab. This contacting line 2004 is made to locate right on the rotation axis 2004a of the side-slab mechanism, so that rotation of the side-slab does not change its location nor affect the sealing. This way, the flow lines of the melt are always continuous without steps or jumps regardless of angle of the side-slab. Further, the cross-section of the cell space is made to be always decreasing by decreasing cell gap sizes along the flow path, as illustrated in sectional views of A-A (2001), B-B (2002) and C-C (2003). The thickness of the side slab, which moves inside the gap, also varies along the flow direction accordingly.

Figure 21:
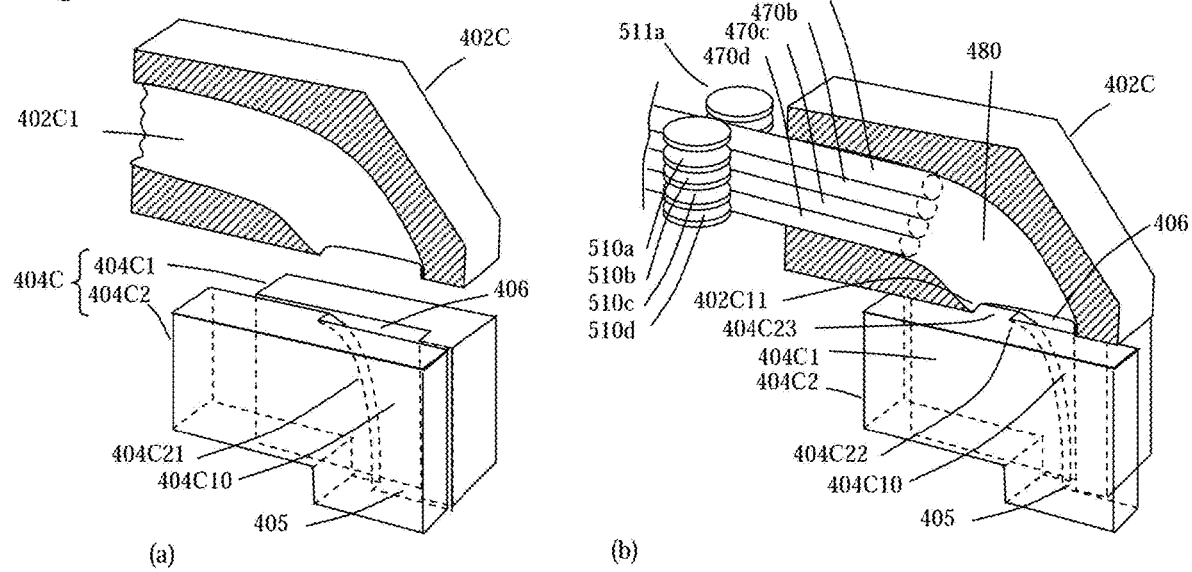
FIG. 21 illustrates still another example approach of adjusting cross-sectional size of dispensed material during dispensing by adjusting dimension of the exit of the dispensing head in this invention.

FIG. 21 depicts another preferred system of the material supply unit and the dispensing head for polymer dispensing by extrusion, which can dispense large amount of material whenever needed. FIG. 21(*a*) shows an exploded view of the material supply unit 402C (showing a cross-section without showing its opposing halt) and the dispensing head 404C. FIG. 21(*b*) illustrates the system assembled together. The dispensing head includes 2 parts, 404C1 and 404C2. Part 404C2 can slide relative to 404C1 to open and close the exit 405. Part 404C2 includes a curved feature 404C21 as one internal surface of the material cell 404C10, so that the cell has a shrinking cross-section along the flow path. In the material supply unit, the material duct 402C1 can take multiple solid wires (470a-d) aligned in an array, as shown in FIG. 21(*b*). When part 404C2 opens to maximal position, the top of the curved feature 404C22 aligns to the edge of the lower end of the material duct 402C11, such that the curvature is generally continuous. In addition, the curves at 404C22 and at 402C1 are made to approach the top surface of the dispensing head at 404C23 in a near asymptotic fashion so that when part 404C2 closes to a smaller exit size, as shown in FIG. 20(*b*), the flow direction of the melt does not change abruptly. As a result, the system has a combined internal shape of always decreasing cross-sectional area along the flow path and the dispensing head can still change its exit size.

Solid wires (470a-d) can be fed into the material supply unit by using a set of rollers or gears (510a-d, 511a). These rollers can be controlled independently so that material feed rate can be controlled to match dispensing volume rate. When the exit is opened to the maximal size, all solid wires can be fed at the same time to supply the required large volume flow rate. When the exit is closed down to the smallest size, only one solid wire needs to be fed to supply the minimal dispensing rate.

Figure 10:
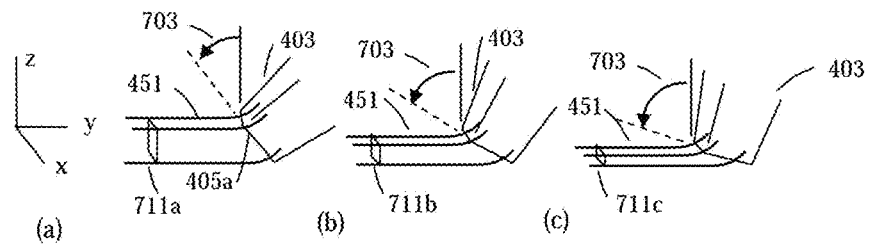
FIG. 10 illustrates another example method of adjusting cross-sectional size of dispensed material during dispensing by adjusting dispensing head orientation in this invention.

By using adjustable exit described above, this invention can change material deposition rate and width as required by local geometry. The design of stacked multiple gating members of FIG. 27 and design of the recess feature and nozzle structure of FIG. 28 can also be applied. When the exit is closed down to minimal size, the system becomes basically similar to the FDM technique. In addition, the methods of changing the width of dispensed materials by adjusting the orientation of the dispensing head as depicted in FIGS. 9 and 10 apply to plastics as well. The design and operation of the differential molds, as depicted in FIGS. 14-19, also apply to plastic materials.

One issue in forming and shaping of polymer material is the so called die swell effect, which involves non-linear scale change when the mechanical boundary conditions around a polymer melt change. When the melt leaves the exit of the dispensing head, the material will expand and will not maintain the cross-sectional shape of the exit. To correct such dimensional change, the exit shape can be designed in anticipation of the die swell effect by referring to experiences and data form traditional polymer extrusion process, for example in the reference book by W. Michaeli, *Extrusion Dies for Plastics and Rubber*, New York: Oxford University Press, or by using polymer processing simulation software.

EXAMPLE 3

Figure 22:
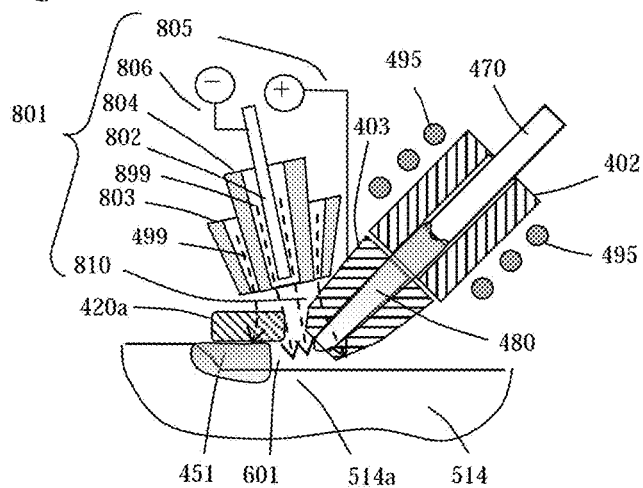
FIG. 22 illustrates an example approach of using an arc-based heating unit for auxiliary and localized heating in this invention.

Molten Metal as Solidifiable Material, 3D Freeform by a Casting-Based Means, with Auxiliary on-Spot Heating If the temperature of the base material, which the solidifiable material to be dispensed onto, is too low or its heat sink is too large, the molten metal from the dispensing head may not be able to heat up the previously solidified material within a short time. In this case, the newly dispensed metal could solidify prematurely without good bonding to the base material. To resolve this issue, an auxiliary heating can be applied on spot, i.e. at the targeted dispensing location, to locally preheat the base material. The auxiliary heating source should be able to deliver concentrated heat in a relatively short time. Such a heating source can be constructed based on the principle of a few industrial fusion welding systems, such as gas tungsten-arc welding, plasma-arc welding, or laser welding. FIG. 22 depicts an example system of this invention with an auxiliary arc-based heating unit. 801 indicates an auxiliary heating unit based on the principle of plasma-arc welding torch. 802 is a tungsten electrode connected as negative electrode. Plasma gas 899 flows through an inner passage 804, whereas shielding gas flows through an outside passage 803. The housing of the dispensing head 403 is connected as positive electrode. As a result, the arc forms mainly in the space 810 between the tungsten electrode and the front end of the dispensing head housing 403. However, high temperature plasma gas can still jet down to reach the target area 514a, rather similar to the case of non-transferred plasma welding scenario. Because plasma arc could generate very high temperature at the core of the plasma gas, a high temperature material, such as graphite, should be used at the outside of the dispensing head housing as the positive electrode. Proper regulation and control small current pulses can generate just enough concentrate heat to heat up the target area. This arrangement allows the arc heating unit to be placed at a distance away from the workpiece (target area) with enough space for the dispensing head tip and the differential mold 420a.

EXAMPLE 4

Plastics (Polymer Material) as Solidifiable Material, 3D Freeform by an Injection-Based Means Polymers in fluid state can be dispensed by methods other than extrusion. For example, the principle of a plastic injection molding machine, more specifically the injection-molding screw mechanism, can be applied to convert solid polymer pellets into melt. Such a mechanism is described in, for example, E. Lokensgard, *Industrial Plastics: Theory and Applications*, 5th ed., Delmar, Clifton Park, N.Y. 2010, p. 155-159, which is herein incorporated into this invention by reference.

EXAMPLE 5

Molten Metal as Solidifiable Material, 3D Freeform by an Injection-Based Means

Molten metals, especially those of lower melting points, can also be dispensed by injection, in analogy to metal injections applied in die casting. Another method to dispense molten metal is to shoot metal droplets. M. Orme and R. F. Smith, "Enhanced Aluminum Properties by Means of Precise Droplet Deposition", *Journal of Manufacturing Science and Engineering*, August 2000, vol. 122, p. 484-493 describes such a system for shooting aluminum droplets in details, which is incorporated to this current invention by reference.

EXAMPLE 6

Making a 3D Article

Figure 23:
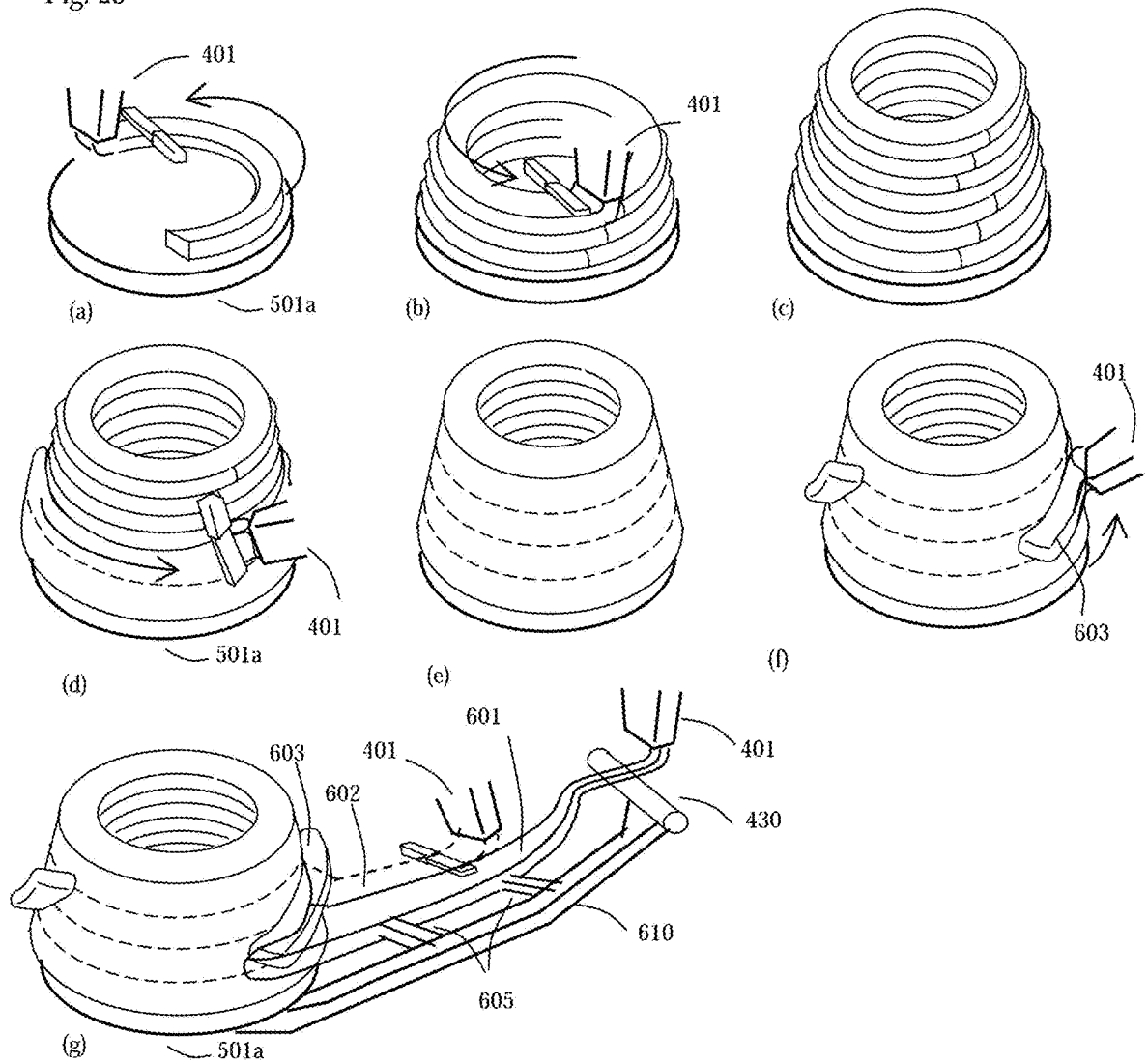
FIG. 23 illustrates an example process of making a 3D article by this invention.

FIG. 23 illustrates the process of making a 3D article, using the 3D part shown in FIG. 1 as an example. For simplicity and clarity, it is assumed that the base 501a and the part do not move, whereas the material dispensing system 401 moves. From FIG. 23(a) to FIG. 23(c), the material dispensing system dispenses materials on the base to make the interior of the hub. From FIG. 23(d) to FIG. 23(e), the external surface of the hub is made. In FIG. 23(f), the roots 603 of the blades are made. This step is similar to the process of FIG. 10. The roots serve as starting structure for blade making in the next step. In FIG. 23(g), blades are made. Material dispensing starts from the roots 603 and moves away from the hub. Depending on material and thickness, dispensed suspending component geometries could have enough stiffness to maintain their shapes without the need of external supports. Whenever external supports are needed, they can be pre-fabricated by the same process before the suspending portions of the part are made. For example, 610 indicates an external support frame attached to the base 501a and the fixture frame 430 on the base, together with short support posts 605 connected to it. When the edge portion 601 of the blade is formed, material is dispensed to pass by and join with the short posts, so as to be supported. When the internal bands are formed, such as 602, they can use adjacent previously dispensed and solidified portion as support. External supports can also be formed under the suspending structure, as what is usually done in the existing FDM process.

EXAMPLE 7

Making Mold Inserts, Especially Seamless Mold Inserts with Conformal Cooling Passages By applying the material dispensing process of this invention, a new method of making 3D article, especially metal molds, featuring combined additive and subtractive processes can be devised. The so called subtractive process is producing shapes by removing materials from a stock. The so called additive process is adding materials by this current flexible 3D freeform method. This new method is especially suitable for making seamless mold inserts with conformal cooling passages. This method can be called "flexible mold surface forming technique".

Figure 24:
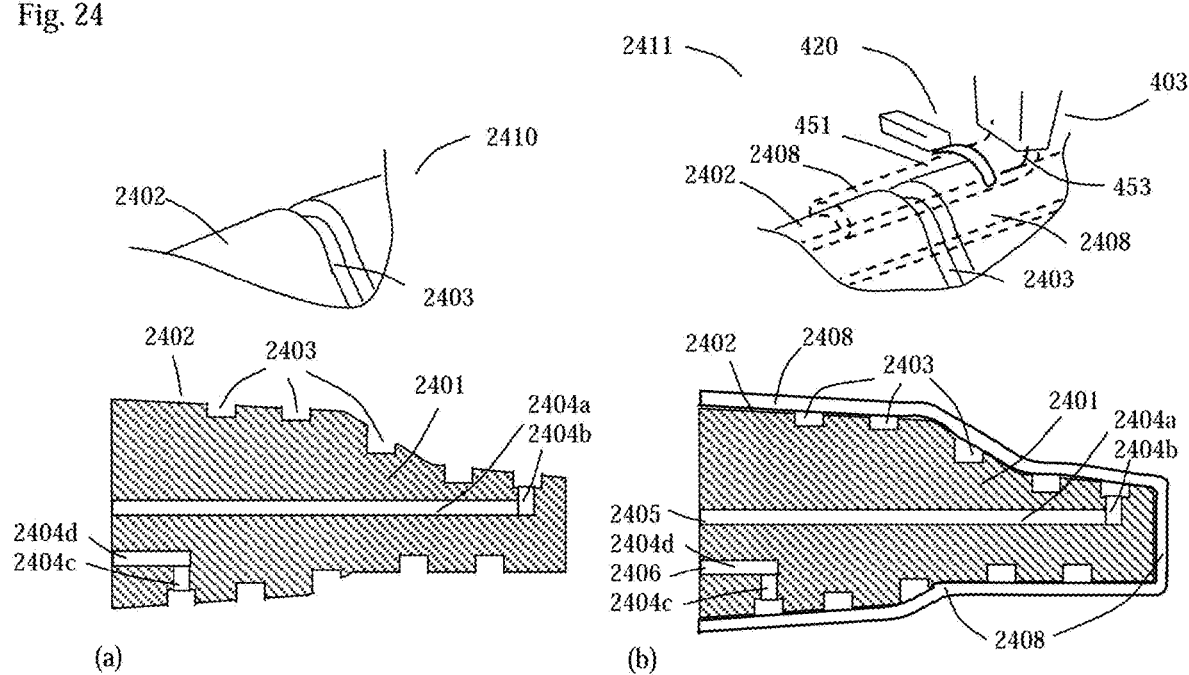
FIG. 24 illustrates an example of making a mold core by the flexible mold surface forming technique in this invention.

FIG. 24 illustrates the first example of making a mold insert by the flexible mold surface forming technique. A mold core 2401 is first produced by machining, as shown in cross-sectional view in FIG. 24(a). Its surface profile 2402 is close to but slightly smaller than the final mold profile. A system of connected ditches (recess structure) 2403 is then made into the surface by machining. A set of holes (2404a-d) are then drilled to connect to two ends of the ditch system. 2410 illustrates a portion of the mold core surface 2402 and the ditch 2403 in enlarged perspective view. In the next step, as illustrated in FIG. 24(b), the material dispensing process of this invention is applied to cover the mold core surface with a layer of material. 2411 shows a local scenario where the dispensed and solidified material (2408, dashed lines) covers the original mold core surface 2402 as well as the ditch 2403. The dispensed material 2408 becomes the new mold surface, covering all ditches. Therefore, the ditch system now becomes internal, conformal passages for cooling fluid. In the completed mold core, cooling fluid enters the core from inlet 2405 and flows into the covered ditch system through holes 2404a-b. The cooling fluid then flows in the covered ditch system 2403 and circulates through the core right underneath the mold surface and then, through holes 2404c-d, out of the outlet at 2406.

Figure 25:
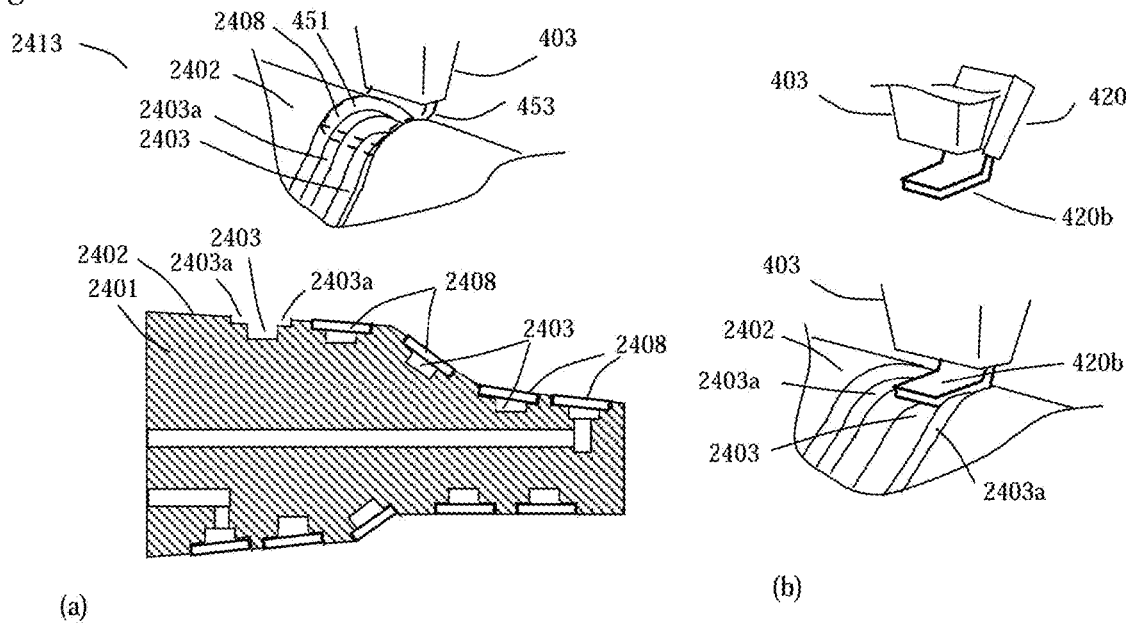
FIG. 25 illustrates another example of making a mold core by the flexible mold surface forming technique in this invention.

FIG. 25 illustrates the second example of making a mold insert by the flexible mold surface forming technique. The mold core 2401 is shown in cross-sectional view. 2413 depicts part of the mold core surface and the surface cooling duct (ditch) in enlarged perspective view. In comparison with FIG. 24, the surface of the mold core 2402 is machined to a dimension very close to the final mold surface, leaving only allowance for final surface polishing. The spiral ditch structure around the core surface includes an additional recessed step feature 2403a along both banks of the ditch 2403. In the step of material dispensing, the solidifiable material is dispensed over the recess feature 2403a to cover up the spiral ditch but not the core surface 2402. In this way, much less material is needed and faster processing can be achieved. When the ditch is wide, in order to prevent dispensed material from falling into the ditch, especially in the case when materials in particulate form are dispensed, a lower differential mold 420b can be applied under the dispensing head 403 and positioned between the two banks of the ditch at the level of the recessed step. The differential mold can thus block the opening of the ditch under the dispensing head so that the dispensed material flows to the recessed step but not into the ditch. This is illustrated in FIG. 25 (b). The lower differential mold 420b can be a separate device 420 or can be a part of the dispensing head, as depicted in FIG. 25 (b). This method can also be applied to the case of FIG. 24.

EXAMPLE 8

Making Seamless Mold Cavity

Figure 26:
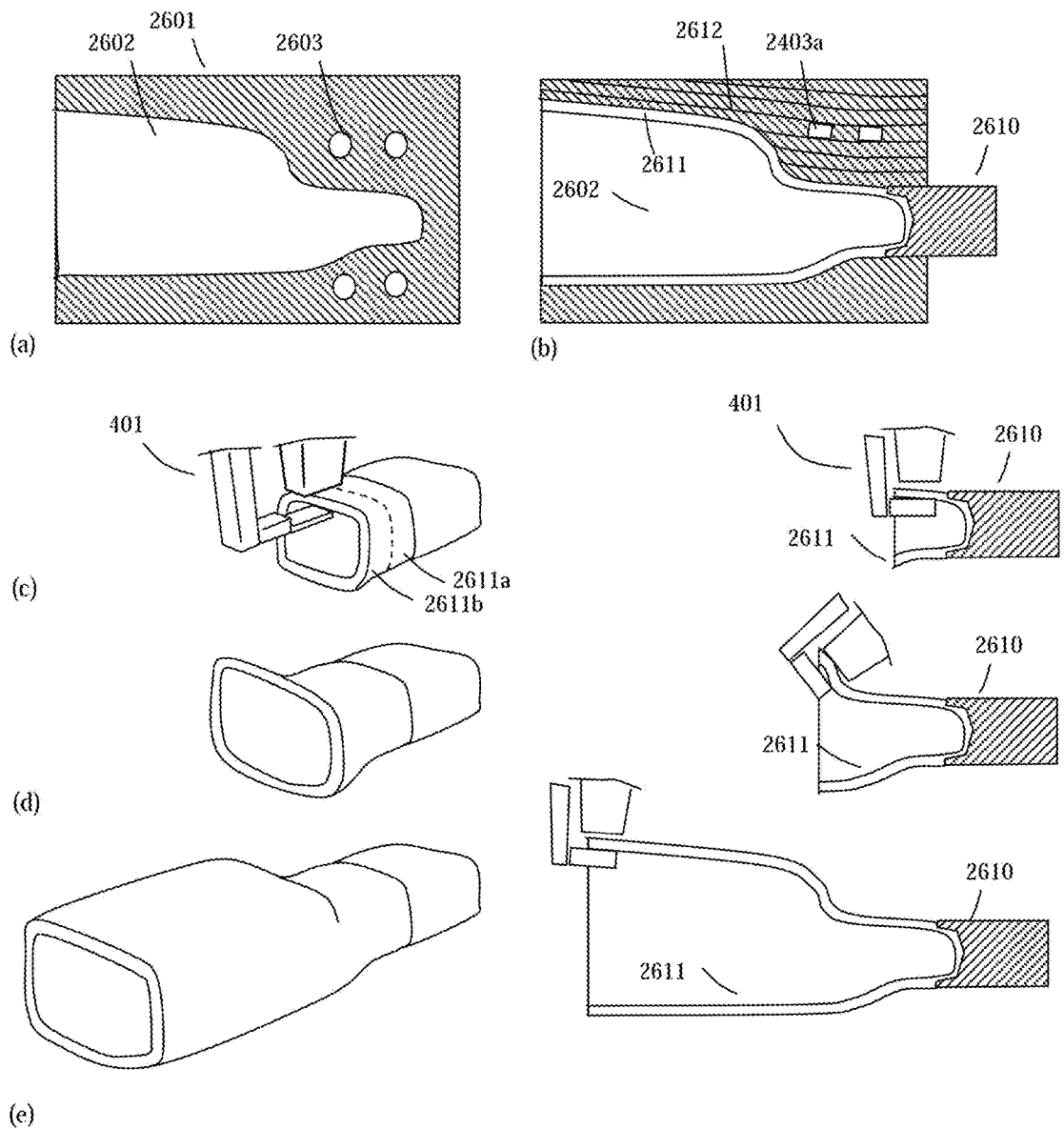
FIG. 26 illustrates an example of making a mold cavity by this invention.

This invention can also be applied to make seamless mold cavity. FIG. 26(a) depicts a cross-sectional view of a mold insert 2601 with the mold cavity 2602 and cooling passages 2603. Such geometry usually requires a slow process of die sinking using electric discharge machining (EDM) to make. FIG. 26(b) illustrates a cross-sectional view of such a geometry made by using the current invention. The process starts with a starting block 2610, which can be made by machining. Then a shell of the inner surface 2611 is made by using the current invention. FIG. 26(c)-(e) depicts the process of making the inner shell 2611. After the inner shell is made, additional layers of materials 2612 are added to the exterior as reinforcement. Internal cooling passages 2403a can also be formed by leaving grooves and then covering them during the buildup of the layers of materials 2612.

Various fillers for tool steels can be used as the solidifiable materials for making mold inserts and information can found from publications such as *Tool Steel Filler Metal Characteristics TIC Welding* from http://www.stood.ind.com/Catalogs/FISC/05catpg394.pdf, and *Welding-Tool-Steel:Difficult but Rewarding Task. Solutions with Effective, Practical*

*Advice* from http://www.welding-advisers.com/Welding-Tool-Steel.html, both documents are incorporated herein for this current invention by reference.

In general, a mold is a tool. Other tools, such as cutting tools or cutting tool holders, with complex Internal cooling passages can also be made by the similar methods described in examples 7 and 8.

The invention claimed is:

1. A process for making a three-dimensional article comprising a curved 3D surface, the process includes:
   dispensing a solidifiable material in a fluid state from a dispensing head onto a target area on a base member at predetermined ambient conditions to form band-shaped materials and sequentially build up multiple band-shaped materials into said curved 3D surface;
   simultaneously with the dispensing of said solidifiable material, changing curvature of the dispensed band-shaped material in its longitudinal direction by applying a differential molding member in physical contact with selected positions on surfaces of the material dispensed at said target area and by varying geometric shape of the physical contact between the differential molding member and the material dispensed;
   simultaneously with the dispensing of said material and the changing of band-shaped material curvature in the longitudinal direction, generating relative movements between said base member and a combination of said dispensing head and said differential molding member in free space, said relative movements creating curvatures along latitudinal directions of the dispensed band-shaped materials;
   the dispensed band-shaped materials in combination forming said curved 3D surface with smooth curvature along directions of said relative movements as well as in directions perpendicular to the directions of said relative movements;
   said differential molding member comprises a deformable member and said varying geometric shape of the physical contact is conducted by deforming said deformable member into shapes corresponding to said predesigned shapes.

2. The process of claim 1, further including a method of engaging and disengaging said differential molding member by a mounting and retracting means for moving said differential molding member to operation position in contact with the dispensed material or to a resting position.

3. The process of claim 2, wherein
   said dispensing head including an elongated exit opening comprising a short edge and a wide long edge, said solidifiable material being dispensed out of said exit opening;
   the dispensing of said solidifiable material including a process of changing cross-sectional dimensions of said solidifiable material while the material is being dispensed and solidifying by adjusting dimensions of said elongated exit opening.

4. The process of claim 3, wherein said adjusting dimensions of said elongated exit opening including applying a first movable gating member for changing dimensions of said elongated exit opening, said first movable gating member carrying a recess feature such that when the gating member is positioned to fully-closed position said recess feature and said dispensing head form a nozzle structure for dispensing materials in wire- and filament-shapes.

5. The process of claim 4, wherein said adjusting dimensions of said elongated exit opening including applying a second gating member for adjusting thickness of the dispensed material, the second gating member being movable in a direction traversing movement direction of said first movable gating member.

6. The process of claim 4, wherein said adjusting dimensions of said elongated exit opening including applying at least one additional movable gating element stacked together with said first movable gating member, said additional movable gating member acting independently for adjusting thickness of the dispensed material.

7. The process of claim 2, wherein
   said three-dimensional article includes an exterior portion of a tool;
   said base member includes an interior portion of said tool and comprises a system of connected ditches;
   the dispensing of said solidifiable material covers said ditches to make said ditches into internal passages of said tool.

8. A process for making a three-dimensional article comprising a curved 3D surface, the process includes:
   dispensing a solidifiable material in a fluid state from a dispensing head onto a target area on a base member at predetermined ambient conditions to form band-shaped materials and sequentially build up multiple band-shaped materials into said curved 3D surface;
   simultaneously with the dispensing of said solidifiable material, changing curvature of the dispensed band-shaped material in its longitudinal direction by applying a differential molding member in physical contact with selected positions on surfaces of the material dispensed at said target area and by varying geometric shape of the physical contact between the differential molding member and the material dispensed;
   simultaneously with the dispensing of said material and the changing of band-shaped material curvature in the longitudinal direction, generating relative movements between said base member and a combination of said dispensing head and said differential molding member in free space, said relative movements creating curvatures along latitudinal directions of the dispensed band-shaped materials;
   the dispensed band-shaped materials in combination forming said curved 3D surface with smooth curvature along directions of said relative movements as well as in directions perpendicular to the directions of said relative movements;
   said differential molding member comprises a curved member having different curvatures on different portions and said varying geometric shape of the physical contact is conducted by rotating said curved member to bring different curvatures corresponding to said predesigned shapes into contact with the solidifying material.

9. The process of claim 8, further including a method of engaging and disengaging said differential molding member by a mounting and retracting means for moving said differential molding member to operation position in contact with the dispensed material or to a resting position.

10. The process of claim 9, wherein
    said dispensing head including an elongated exit opening comprising a short edge and a wide long edge, said solidifiable material being dispensed out of said exit opening;
    the dispensing of said solidifiable material including a process of changing cross-sectional dimensions of said solidifiable material while the material is being dispensed and solidifying by adjusting dimensions of said elongated exit opening.

11. The process of claim 10, wherein said adjusting dimensions of said elongated exit opening including applying a first movable gating member for changing dimensions of said elongated exit opening, said first movable gating member carrying a recess feature such that when the gating member is positioned to fully-closed position said recess feature and said dispensing head form a nozzle structure for dispensing materials in wire- and filament-shapes.

12. The process of claim 11, wherein said adjusting dimensions of said elongated exit opening including applying a second gating member for adjusting thickness of the dispensed material, the second gating member being movable in a direction traversing movement direction of said first movable gating member.

13. The process of claim 11, wherein said adjusting dimensions of said elongated exit opening including applying at least one additional movable gating element stacked together with said first movable gating member, said additional movable gating member acting independently for adjusting thickness of the dispensed material.

14. The process of claim 9, wherein
said three-dimensional article includes an exterior portion of a tool;
said base member includes an interior portion of said tool and comprises a system of connected ditches;
the dispensing of said solidifiable material covers said ditches to make said ditches into internal passages of said tool.

* * * * *